United States Patent
Ichien et al.

(10) Patent No.: US 12,515,333 B2
(45) Date of Patent: Jan. 6, 2026

(54) CONTROL DEVICE, CONTROL METHOD, AND STORAGE MEDIUM

(71) Applicant: NEC Corporation, Tokyo (JP)

(72) Inventors: Masumi Ichien, Tokyo (JP); Masatsugu Ogawa, Tokyo (JP); Hisaya Wakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 191 days.

(21) Appl. No.: 18/274,144

(22) PCT Filed: Jan. 27, 2021

(86) PCT No.: PCT/JP2021/002823
§ 371 (c)(1),
(2) Date: Jul. 25, 2023

(87) PCT Pub. No.: WO2022/162784
PCT Pub. Date: Aug. 4, 2022

(65) Prior Publication Data
US 2025/0083316 A1    Mar. 13, 2025

(51) Int. Cl.
*B25J 9/16*    (2006.01)
(52) U.S. Cl.
CPC ........... *B25J 9/1661* (2013.01); *B25J 9/1653* (2013.01); *B25J 9/1679* (2013.01)
(58) Field of Classification Search
CPC ...... B25J 9/1661; B25J 9/1653; B25J 9/1679; B25J 13/00
See application file for complete search history.

(56) References Cited

U.S. PATENT DOCUMENTS

| | | |
|---|---|---|
| 2007/0007924 A1 | 1/2007 | Nishihara et al. |
| 2010/0094453 A1 | 4/2010 | Nishihara et al. |
| 2012/0165972 A1 | 6/2012 | Wappling et al. |
| 2016/0129592 A1* | 5/2016 | Saboo ............... B25J 5/007 700/248 |
| 2016/0151916 A1 | 6/2016 | Kanno et al. |
| 2018/0001469 A1 | 1/2018 | Ooba |
| 2018/0085922 A1 | 3/2018 | Ooba |
| 2019/0351542 A1 | 11/2019 | Buerger et al. |
| 2020/0156236 A1* | 5/2020 | Lager ............... B25J 9/163 |

(Continued)

FOREIGN PATENT DOCUMENTS

| | | |
|---|---|---|
| JP | H09-052623 A | 2/1997 |
| JP | H10-105217 A | 4/1998 |
| JP | 2007-015055 A | 1/2007 |

(Continued)

OTHER PUBLICATIONS

International Search Report for PCT Application No. PCT/JP2021/002823, mailed on Apr. 20, 2021.

*Primary Examiner* — Dylan M Katz

(57) ABSTRACT

A control device 1X mainly includes a state setting means 16X and an operation planning means 17X. The state setting means 16X sets a predicted start state that is a predicted state of a workspace at a time when a robot starts a work of sorting items and a target state which represents a state where the items are placed in sorting containers by the work, based on information regarding the items and the sorting containers. The operation planning means 17X determines an operation plan of the robot based on the predicted start state and the target state.

9 Claims, 12 Drawing Sheets

(56) References Cited

U.S. PATENT DOCUMENTS

2021/0197391 A1  7/2021  Ohnishi et al.

FOREIGN PATENT DOCUMENTS

| JP | 2010-202291 A | 9/2010 |
| JP | 2016-107349 A | 6/2016 |
| JP | 2018-001312 A | 1/2018 |
| JP | 2018-051684 A | 4/2018 |
| JP | 2019-200792 A | 11/2019 |
| JP | 2020-142323 A | 9/2020 |

* cited by examiner

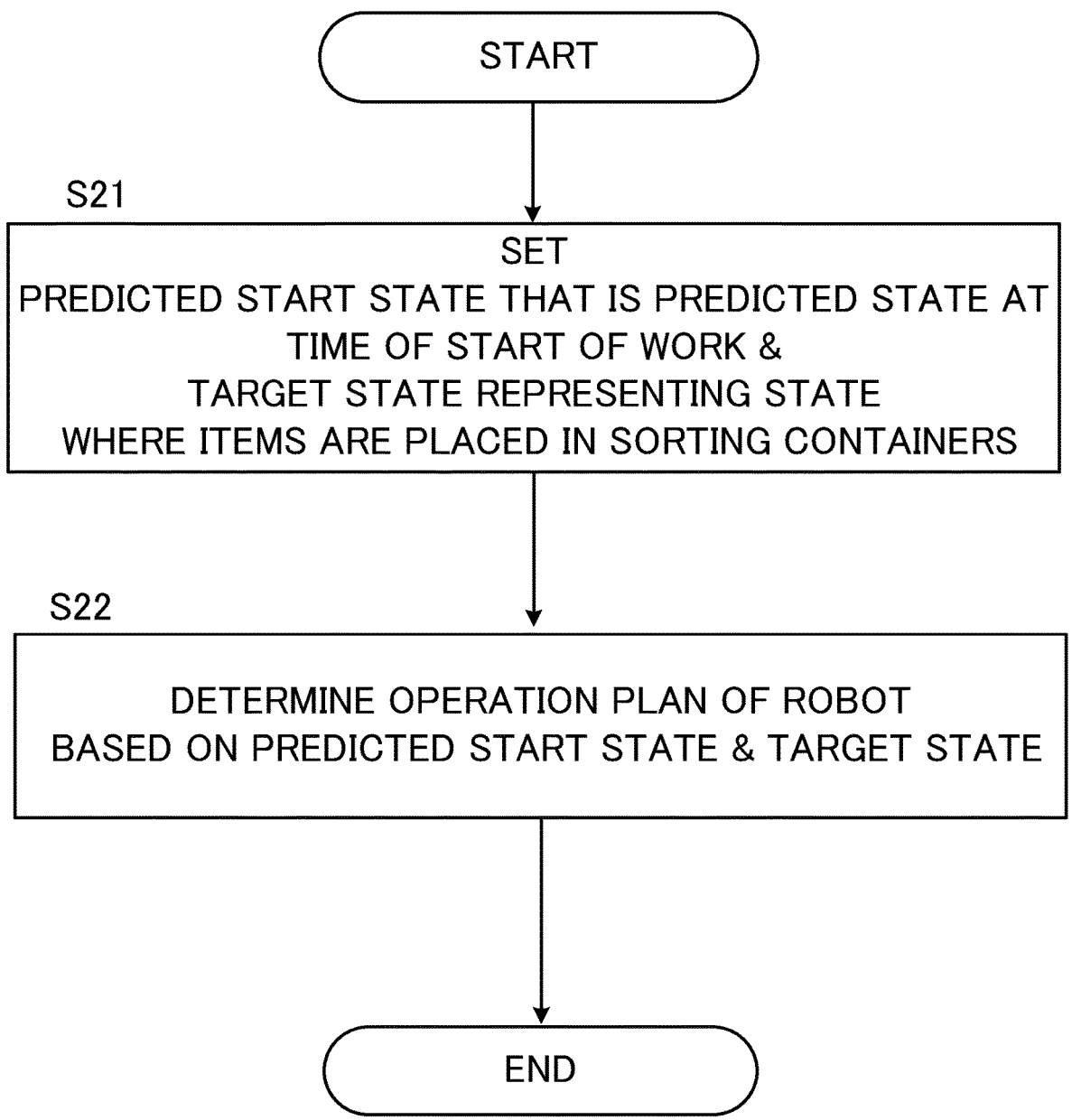

CONTROL DEVICE, CONTROL METHOD, AND STORAGE MEDIUM

This application is a National Stage Entry of PCT/JP2021/002823 filed on Jan. 27, 2021, the contents of all of which are incorporated herein by reference, in their entirety.

TECHNICAL FIELD

The present invention relates to a technical field regarding a control device, a control method, and a storage medium for processing relating to a task to be worked by a robot.

BACKGROUND

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container board on the index calculated with respect to each of the possible orders. Further, Patent Literature 2 discloses a system configured to cause a robot to pack separated parts in a sort pallet in accordance with the packing plan of the separated parts.

CITATION LIST

Patent Literature

Patent Literature 1: JP 2018-051684A
Patent Literature 2: JP 2010-202291A

SUMMARY

Problem to be Solved

A work of sorting a plurality of types of items accommodated in a box such as corrugated cardboard by type or lot number is related to plural works such as picking up items from a box, moving items into a sorting container (tray) according to the type of the items, conveying the tray. Thus, for such a work, it is difficult to formulate a robot's operation plan to automate work.

In view of the issues described above, one object of the present invention is to provide a control device, a control method, and a storage medium capable of causing a robot to suitably perform a task relating to sorting items.

Means for Solving the Problem

In one mode of the control device, there is provided a control device including:
a state setting means configured to set
a predicted start state that is a predicted state of a workspace at a time when a robot starts a work of sorting items and
a target state which represents a state where the items are placed in sorting containers by the work,
based on information regarding the items and the sorting containers;
an operation planning means configured to determine an operation plan of the robot based on the predicted start state and the target state.

In one mode of the control method, there is provided a control method executed by a computer, the control method including
setting
a predicted start state that is a predicted state of a workspace at a time when a robot starts a work of sorting items and
a target state which represents a state where the items are placed in sorting containers by the work,
based on information regarding the items and the sorting containers;
determining an operation plan of the robot based on the predicted start state and the target state.

In one mode of the storage medium, there is provided a storage medium storing a program executed by a computer, the program causing the computer to:
set
a predicted start state that is a predicted state of a workspace at a time when a robot starts a work of sorting items and
a target state which represents a state where the items are placed in sorting containers by the work,
based on information regarding the items and the sorting containers;
determine an operation plan of the robot based on the predicted start state and the target state.

Effect

An example advantage according to the present invention is to suitably cause a robot to perform a task relating to sorting items.

BRIEF DESCRIPTION OF THE DRAWINGS

FIG. 12 It is an example of a flowchart to be executed by the control device in the second example embodiment.

EXAMPLE EMBODIMENTS

Hereinafter, example embodiments of a control device, a control method, and a storage medium will be described with reference to the drawings.

First Example Embodiment

(1) System Configuration

Figure 1:
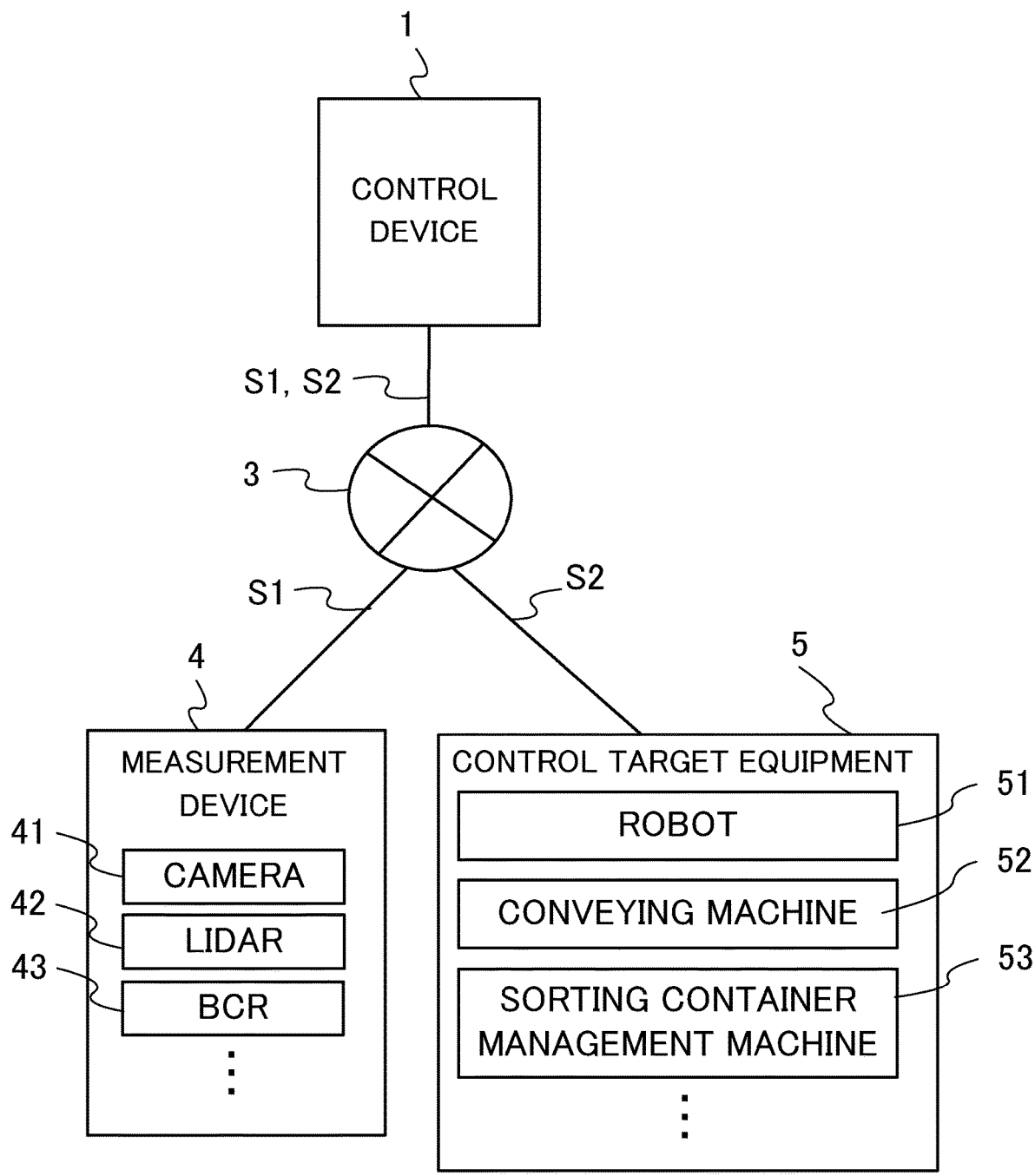
FIG. 1 It is an example of the configuration of a sorting control system in a first example embodiment.

FIG. 1 shows a configuration of a sorting control system 100 according to the first example embodiment. The sorting control system 100 automatically or semi-automatically executes a work (also referred to as "parts sorting") of sorting (assorting) items such as chemicals carried in a warehouse by type or lot number, and mainly includes a control device 1, a measurement device 4, and a control target equipment 5. The control device 1 and the measurement device 4 and the control target equipment 5 performs data communication via the communication network 3 with one another.

The control device 1 supplies, based on a measurement signal "S1" supplied from the measurement device 4, a control signal "S2" required to execute the parts sorting, to the control target equipment 5 such as a robot 51. In this case, the control device 1 sets a task (also referred to as "objective task") to be executed by the robot 51, and formulates an operation plan of the robot 51 for executing the set objective task based on temporal logics. In this case, the control device 1 converts the objective task into a time-step based sequence (sequence for each time step) of tasks each of which the robot 51 can accept. Then, the control device 1 controls the robot 51 by supplying a control signal S2 representing the generated operation sequence to the robot 51. Thereafter, each task (command) into which the objective task is decomposed by a unit that is acceptable to the robot 51 is referred to as "subtask," and a sequence of subtasks to be executed by the robot 51 in order to accomplish the objective task is referred to as "operation sequence". In the present example embodiment, as an example, the process of formulating the operation plan based on the temporal logic will be described. However, instead of formulating the operation plan based on the temporal logic, the control device 1 may formulate the operation plan according to any other method.

The measurement device 4 is one or more sensors configured to detect a state (condition) in the workspace where the parts sorting is performed. The measurement device 4 includes, for example, a camera 41, a lidar 42, and a BCR (Bar-Code Reader) 43. The measurement device 4 supplies the generated measurement signal S1 to the control device 1 via the communication network 3. The measurement device 4 may include a self-propelled sensor or a flying sensor (including a drone) that moves within the workspace. The measurement device 4 may also include a sensor provided in the control target equipment 5 such as the robot 51 and a sensor provided in any other object in the workspace. The measurement device 4 may also include a sensor configured to detect sound in the workspace. As such, the measurement device 4 may include a variety of sensors configured to detect the state in the workspace, and may include a sensor provided at any location.

The control target equipment 5 is provided in the workspace where the parts sorting is performed, and is controlled based on the control signal S2 or the like supplied from the control device 1. In the present example embodiment, as an example, the control target equipment 5 includes the robot 51, a conveying machine (conveyor) 52 for conveying items in a warehouse, and a sorting container management machine 53 which manages sorting containers such as a tray and a foldable container in which the robot 51 places the sorted items. There may be a plurality of robots 51 in the workspace, and the robots 51 perform tasks relating to parts sorting cooperatively as necessary. The robot 51 may be any type of robot such as a vertical articulated robot and a horizontal articulated robot. The robot 51 may supply a state signal indicating the state of the robot 51 to the control device 1. The state signal may be an output signal from a sensor for detecting the entire state (e.g., position and angle) of the robot 51 or the state of a specific part, such as a joint, of the robot 51 or a specific site, and it may be a signal indicating the progress of a subtask of the robot 51 generated by the control unit of the robot 51.

The configuration of the sorting control system 100 shown in FIG. 1 is an example, and various changes may be made to the configuration. For example, the control device 1 may perform data communication with the measurement device 4 and the control target equipment 5, by wireless or wired direct communication without passing through the communication network 3. Further, the control device 1 and the robot 51 may be integrally configured. The control device 1 may be configured by a plurality of devices. In this case, the plurality of devices constituting the control device 1 exchange information necessary to execute the process allocated in advance, among the plurality of devices. Further, the robot 51 may incorporate at least some or all of the functions of the control device 1.

(2) Hardware Configuration

Figure 2:
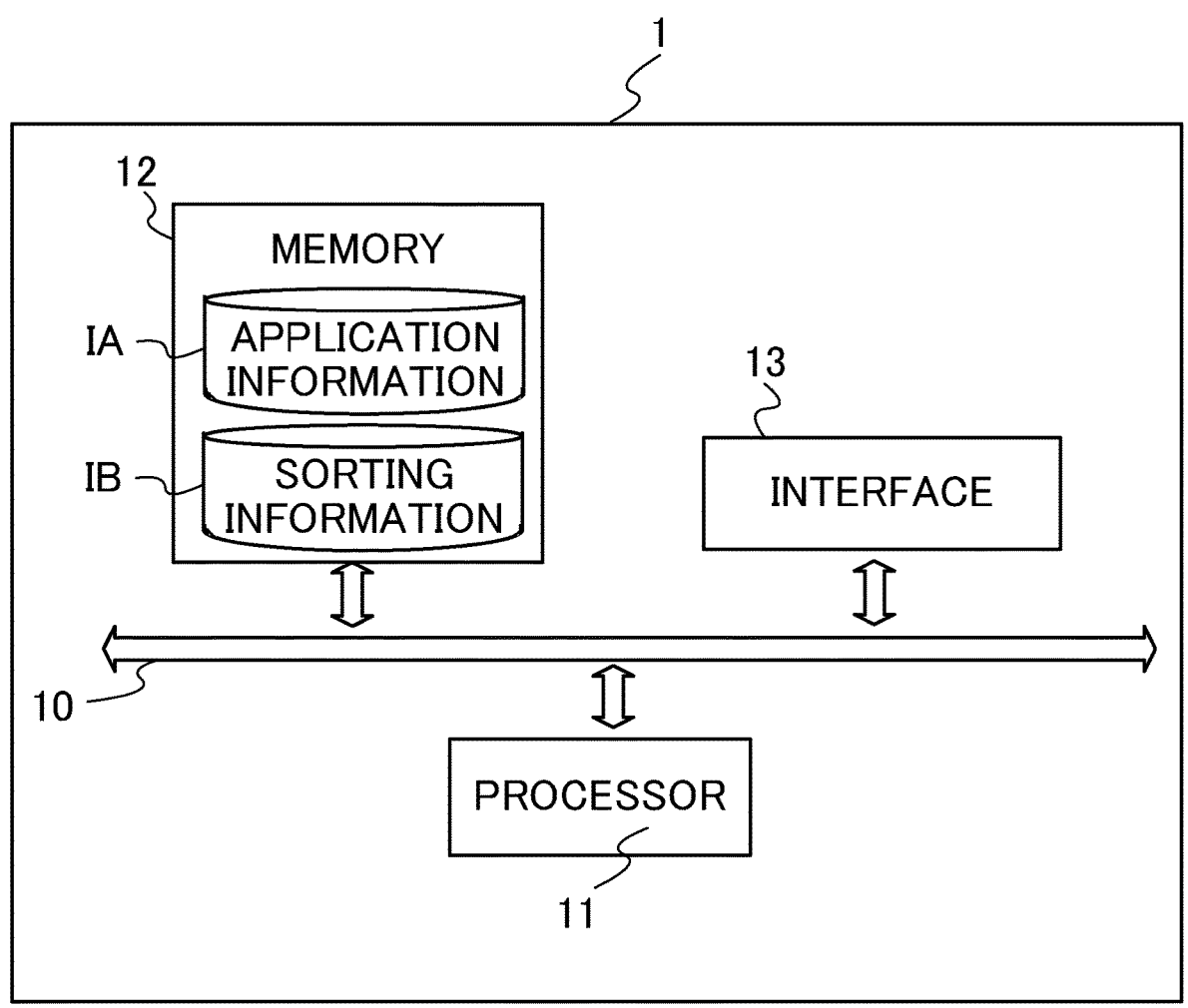
FIG. 2 It is an example of the hardware configuration of a control device.

FIG. 2 shows a hardware configuration of the control device 1. The control device 1 includes a processor 11, a memory 12, and an interface 13 as hardware. The processor 11, the memory 12 and the interface 13 are connected to one another via a data bus 10.

The processor 11 functions as a controller (arithmetic unit) for controlling the entire control device 1 by executing a program stored in the memory 12. Examples of the processor 11 include a CPU (Central Processing Unit), a GPU (Graphics Processing Unit), and a TPU (Tensor Processing Unit). The processor 11 may be configured by a plurality of processors. The processor 11 is an example of a computer.

The memory 12 is configured by a variety of volatile and non-volatile memories, such as a RAM (Random Access Memory), a ROM (Read Only Memory), and a flash memory. Further, the memory 12 stores a program for the control device 1 to execute a process. The memory 12 also includes application information IA and sorting information IB.

The application information IA is various information required for generating an operation sequence that is a sequence to be executed by the robot 51 from the objective task. The sorting information IB is information related to sorting of items, and is, for example, information in which identification information (ID) of each item identified based on the measurement signal S1 from the measurement device 4 is associated with the class of the each item. The above-mentioned class is determined by classification based on whether or not they are supposed to be housed in the same sorting container, e.g., based on the type or the lot number of the each item. If the ID (identification information) is attached to each sorting container, the sorting information IB may be information in which the ID of each item is associated with the ID of the sorting container to be the destination of the each item.

A part of the information stored in the memory 12 may be stored by one or more external storage devices that can communicate with the control device 1, or may be stored by a storage medium such as a flash memory removable from the control device 1.

The interface 13 is one or more interfaces for electrically connecting the control device 1 to other devices. Examples of these interfaces include a wireless interface, such as network adapters, for transmitting and receiving data to and from other devices wirelessly, and a hardware interface, such as a cable, for connecting to other devices.

The hardware configuration of the control device 1 is not limited to the configuration shown in FIG. 2. For example, the control device 1 may be connected to or incorporate at least one of a display device, an input device, and a sound output device.

(3) Overview of Parts Sorting

Figure 3:
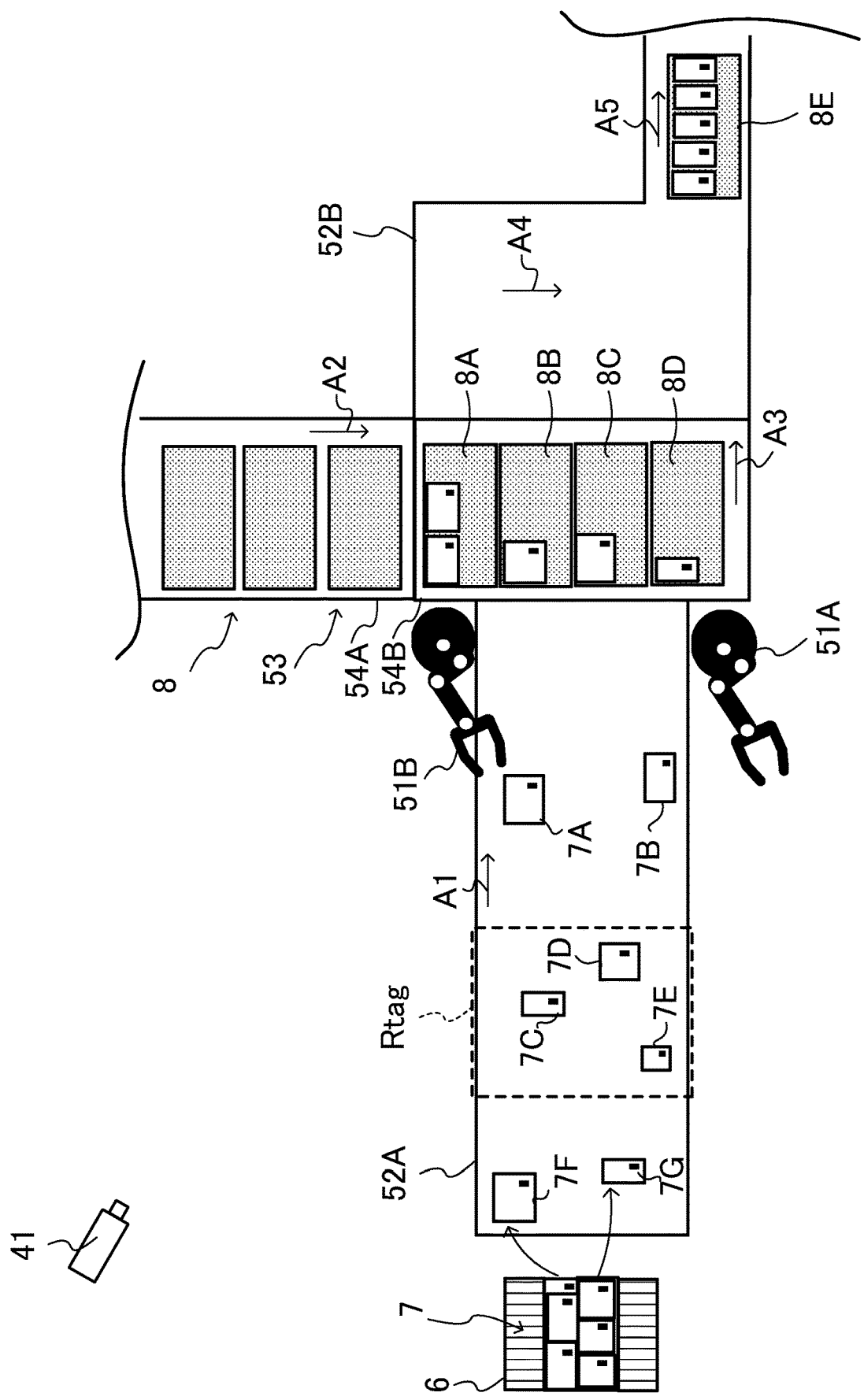
FIG. 3 It is an example of a bird's-eye view of a workspace of sorting separated parts.

FIG. 3 is an overhead view of the workspace schematically illustrating an example of parts sorting by the sorting control system 100. FIG. 3 schematically illustrates the work of sorting the items 7 (7A to 7G, . . . ) taken out from a packing box 6 in the warehouse into a plurality of sorting containers 8 (8A to 8D, . . . ), wherein the packing box 6 which houses a plurality of types of items to be sorted is delivered from manufacturer or the like to the warehouse. The camera 41 is installed so that the workspace is included within the photographing range. The camera 41 may be a plurality of cameras having different photographing ranges, and may capture images respectively to cover necessary points for the state recognition of the workspace. Further, in the workspace shown in FIG. 3, any measuring device 4 other than the camera 41 may be provided.

In the workspace shown in FIG. 3, there are a first conveying machine 52A and a second conveying machine 52B which are examples of the conveying machine 52, and there is provided a sorting container management machine 53 for managing the sorting containers 8 between the first conveying machine 52A and the second conveying machine 52B. In FIG. 3, the flow of the items 7 on the first conveying machine 52A is indicated by an arrow A1, the flow of the sorting containers 8 on the second conveying machine 52B is indicated by arrows A4 and A5, and the flow of the sorting containers 8 on the sorting container management machine 53 is indicated by arrows A2 and A3, respectively.

Each item 7 picked up from the packing box 6 are placed on the first conveying machine 52A. The first conveying machine 52A is, for example, a conveyor belt, and conveys the items 7 (7A to 7G, . . . ) taken out from the packing box 6 by a worker or a robot in the direction toward a range (referred to as "movement range") where the robot arm 51A or the robot arm 51B can grasp an item 7. The first conveying machine 52A may be equipped with the BCR 43 for reading the bar code of each item prior to reaching the movement ranges of the robot arms 51A and 51B. The conveying speed by the first conveying machine 52A may be a constant speed, or may be adjusted under the control of the control device 1 or the like. For example, during the operation period of the robot arm 51A and/or the robot arm 51B, the first conveying machine 52A may be adjusted by the control device 1 to pause or decelerate.

The second conveying machine 52B is a material handling machine configured to convey the sorting containers 8 containing the sorted items 7 to an area of shelf(s) which house the sorting containers 8. In the example shown in FIG. 3, the second conveying machine 52B conveys, in the direction indicated by the arrow A4 and arrow A5, the sorting containers 8 transferred from the sorting container management machine 53.

The sorting container management machine 53 is provided between the first conveying machine 52A and the second conveying machine 52B and transfers the sorting containers 8 to the second conveying machine 52B and replenishes the sorting containers 8. The sorting container management machine 53 has a replenishment management machine 54A on which empty sorting containers 8 for replenishment are placed, and an unloading management machine 54B on which sorting containers 8 where items 7 are to be placed by pick-and-place operation of the robot arms 51A and 51B.

The replenishment management machine 54A functions as a conveyor, and loads a sorting container 8 for replenishment and transfer it to the unloading management machine 54B. Specifically, if any of the sorting containers 8 placed on the unloading management machine 54B is transferred onto the second conveying machine 52B, the replenishment management machine 54A supplies a new sorting container 8 for replenishment to the unloading management machine 54B. In this case, for example, the replenishment management machine 54A pushes (slides) the sorting container 8 for the replenishment towards the unloading management machine 54B that is the supplying destination to thereby supply the sorting container 8 of the supply destination of for replenishment. For example, if any of the sorting containers 8B to 8D shown in FIG. 3 is transferred to the second conveying machine 52B, the replenishment management machine 54A supplies a new sorting container 8 for replenishment to the unloading management machine 54B thereby to push the sorting container 8A into the position of the sorting container 8B shown in FIG. 3 and place the sorting container 8 for replenishment in a position where the sorting container 8A was present.

The unloading management machine 54B functions as a place where the sorting containers 8 each serving as a candidate for the destination of the item 7 grasped by the robot arm 51A or 51B are placed, and also functions as a conveyor for individually transferring the sorting container 8 to the second conveying machine 52B. For example, the unloading management machine 54B transfers the sorting container 8 onto the second conveying machine 52B, if there is a sorting container 8 in a predetermined reference state (e.g., a state that any further item 7 cannot be accommodated), or, if an additional sorting container 8 is needed to be loaded on the unloading management machine 54B. In this case, for example, the unloading management machine 54B, has a mechanism of sliding each of the sorting container 8 individually, and based on the control signal S2 supplied from the control device 1, moves the designated sorting container 8 onto the second conveying machine 52B by sliding it to the direction toward the second conveying machine 52B.

It is noted that the operation of transferring the sorting container 8 onto the second conveying machine 52B may be performed manually, or it may be performed by the robot 51 such as the robot arm 51A and the robot arm 51B. In the later cases, the robot arm 51A or the robot arm 51B moves the target sorting container 8 onto the second conveying machine 52B by a pushing operation or a pick-and-place operation of the target sorting container 8 on the basis of a control signal S2 supplied from the control device 1. Similarly, the operation of replenishing the unloading management machine 54B with a sorting container 8 may be performed manually or it may be performed by the robot 51 such as the robot arm 51B.

The robot arm 51A and the robot arm 51B are provided at positions facing each other across the first conveying machine 52A. In some embodiments, the movement range of the robot arm 51A and the movement range of the robot arm 51B are partially overlapped with each other on the first conveying machine 52A and each may be provided at a position covering a range outside the movement range of the other on the first conveying machine 52A. This allows at least either the robot arm 51A or the robot arm 51B to grasp the item 7 on the first conveying machine 52A. Besides, since the movement ranges overlap with each other, the robot arm 51A and the robot arm 51B can pass or receive an item 7 to or from each other. Specifically, provided that a target item 7 exists within the movement range of one robot arm and that a sorting container 8 where the target item 7 should be placed exists outside the movement range of the one robot arm and that the target item 7 exists outside the movement range of the other robot arm, the one robot arm places the target item 7 into the movement range of the other robot arm. In this case, the other robot arm moves the target item 7 moved by the one robot arm into the appropriate sorting container 8 by pick and place operation. The control device 1 incorporates such an operation into the operation plan regarding the robot arms 51A and 51B, so that the robot arms 51A and 51B can perform the sorting operation so as to move the item 7 placed at any position on the first conveying machine 52A into the appropriate sorting container 8.

Further, in the present example embodiment, the control device 1 periodically performs a cycle of work regarding parts sorting. Each cycle includes formulation of the operation plan and execution control of the robot 51 according to the operation plan. The control device 1 determines, in each cycle, one or more items 7 (also referred to as "sorting target items") to be sorted in a single operation plan, based on the number of the items 7 or the range thereof, and performs the formulation of the operation plan and the execution control according to the operation plan for the determined sorting target items. In FIG. 3, a range (also referred to as "sorting target range Rtag") within which an item is identified as a sorting target item is set at an upstream position (i.e., a position where the item 7 does not reach the movement range) in front of the movement range of the robot arms 51A and 51B. The control device 1 recognizes the items 7 (in FIG. 3, the items 7C to 7E) existing in the sorting target range Rtag as the sorting target items in a single operation plan. Here, for example, the sorting target areas Rtag are provided at the same position in the respective cycles, and each position thereof on the conveying surface (e.g., belts) of the first conveying machine 52A is adjacent to the positions thereof in the preceding and subsequent cycles. In other words, the sorting target range Rtag is provided so that the same item 7 does not become the sorting target item in different operation plans and every item on the first conveying machine 52A becomes a sorting target item in any of the operation plans.

Then, in the example shown in FIG. 3, on the basis of the pipeline processing to be described later, the control device 1 determines that the items 7C to 7E are the sorting target items in the current cycle, before the completion of the pick-and-place operation of the items 7A and 7B determined as the sorting target items in the preceding cycle.

(4) Overview of Pipeline Processing

The control device 1 performs pipeline processing when cyclically performing a cycle of parts sorting including the formulation of an operation plan related to parts sorting and the execution of the operation plan by the robot 51.

Figure 4A:
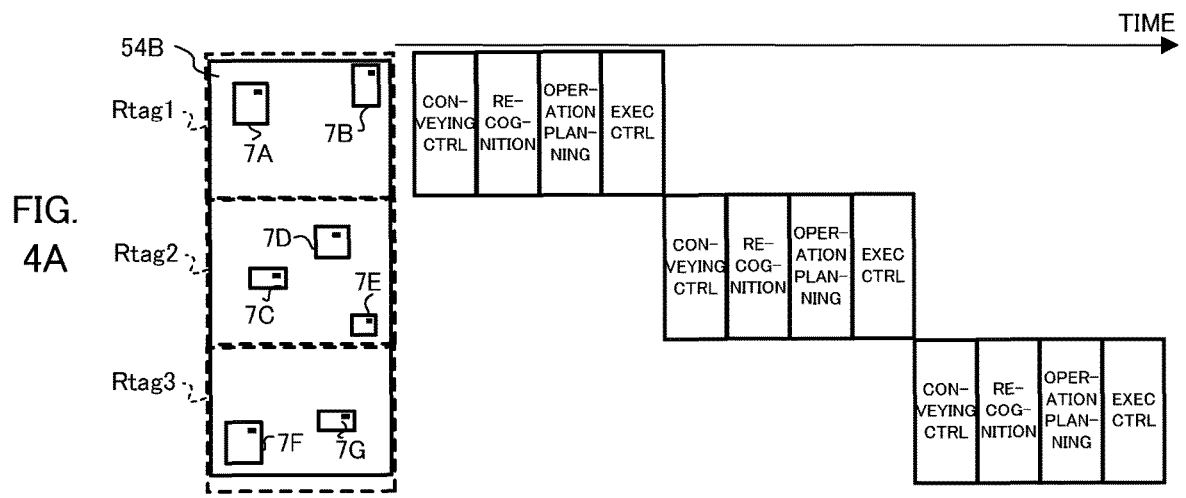
FIG. 4A is a diagram showing a work cycle not including pipeline processing.
Figure 4B:
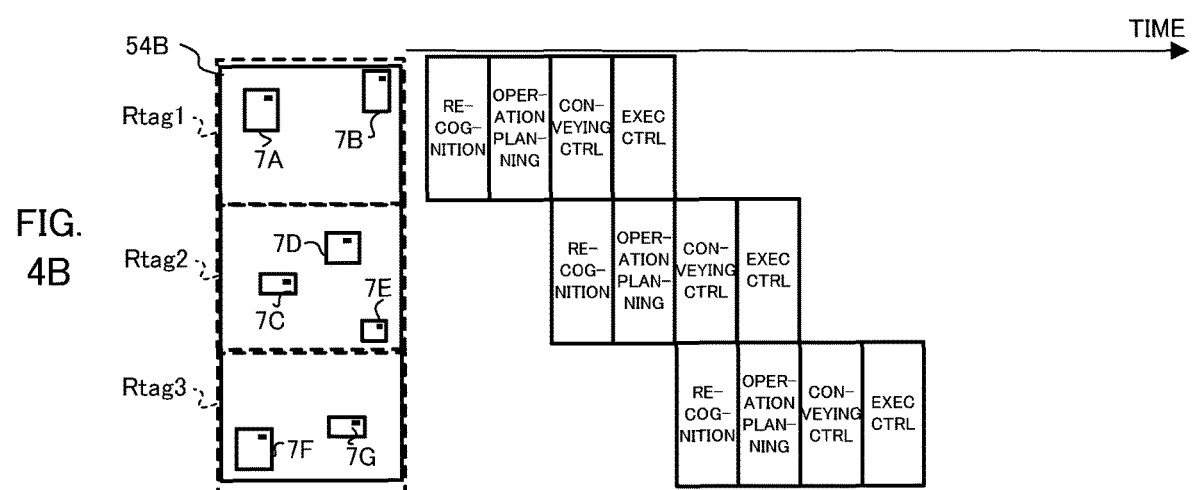
FIG. 4B is a diagram showing a pipelined work cycle in a first embodiment.
Figure 4C:
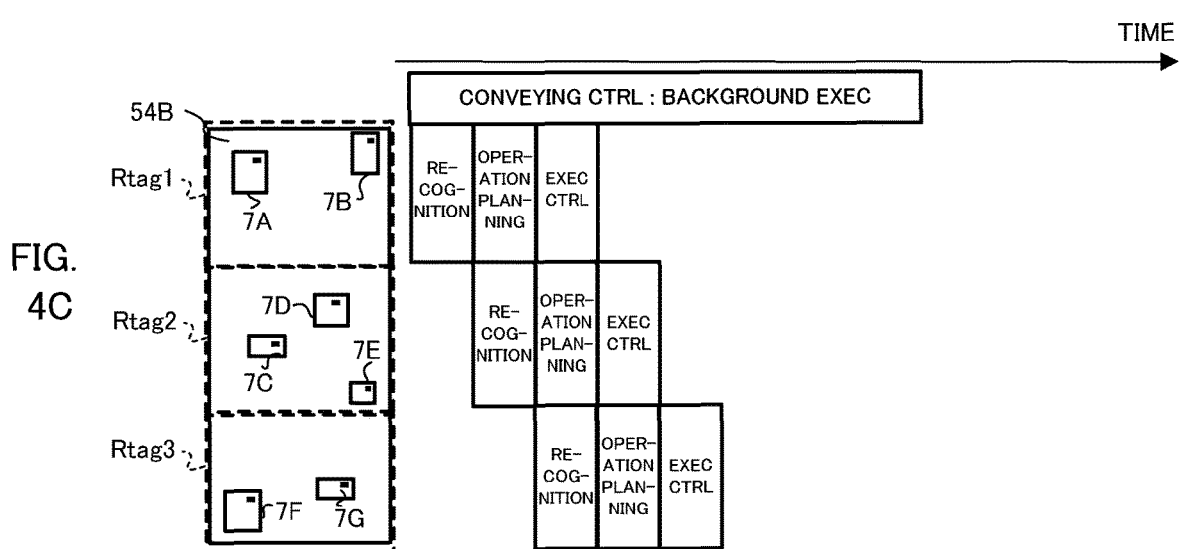
FIG. 4C is a diagram showing a pipelined work cycle in a second embodiment.

FIG. 4A is a diagram illustrating the parts sorting process for three cycles (the first cycle to the third cycle) which does not include the pipeline processing with clear indication of the corresponding sorting target items. Further, FIG. 4B is a diagram illustrating the parts sorting process for three cycles according to the first embodiment of the pipeline processing with clear indication of the corresponding sorting target items and FIG. 4C is a diagram illustrating the parts sorting process for three cycles according to the second embodiment of the pipeline processing with clear indication of the corresponding sorting target items. In the present example embodiment, the control device 1 realizes a pipeline processing based on the embodiment shown in either FIG. 4B or FIG. 4C.

In FIGS. 4A to 4C, the sorting target range Rtag set in the first cycle is denoted by "Rtag1", the sorting target range Rtag set in the second cycle is denoted by "Rtag2", and the sorting target range Rtag set in the third cycle is denoted by "Rtag3". Then, in the first cycle, the items 7A and 7B are recognized as the sorting target items, and in the second cycle, the items 7C to 7E are recognized as the sorting target items. In the third cycle, the items 7F and 7G are recognized as the sorting target items. Further, in FIGS. 4A to 4C, the term "CONVEYING CTRL" indicates a control to convey (move) the items 7 by the first conveying machine 52A, and the term "RECOGNITION" indicates a process to recognize (including identify the sorting target items) the state of the workspace based on the measurement signal S1 from the measuring device 4. The term "OPERATION PLANNING" indicates a process related to the operation planning regarding the robot arms 51A and 51B (i.e., generation processing of the operation sequence), and the term "EXEC CTRL" indicates the control of the robot arms 51A and 51B based on the operation plan. The width (i.e., required time length) thereof shown in FIG. 3 along the time axis is an example, the individually required time length is actually allocated for each process.

In the example shown in FIG. 4A, when the first cycle of the pick-and-place work for the items 7A and 7B is fully completed, the second cycle of the pick-and-place work for the items 7C to 7E, which is the subsequent cycle, is performed. After the completion thereof, the third cycle of the pick-and-place work for the items 7F and 7G is performed. Thus, in the example embodiment illustrated in FIG. 4A, in each cycle, after the items 7 are conveyed within the movement range of the robot arm 51A or 51B by the conveying control, the conveying control is stopped, and thereafter the recognition process of the sorting target items and the like, the formulation of the operation plan for the sorting target items, and the execution control regarding the operation plan are sequentially performed.

In the example shown in FIG. 4B, the recognition process and the operation planning in the second cycle are performed in parallel with the conveying control and the execution control of the operation plan in the first cycle, and the recognition process and the operation planning in the third cycle are performed in parallel with the conveying control and the execution control of the operation plan in the second cycle. Here, in each cycle, the control device 1 performs the recognition process and the operation planning prior to the conveying control. In this instance, in the recognition process and the operation planning, the control device 1 predicts the state of the workspace (e.g., the positions of the items 7 and the state of the sorting containers 8) at the beginning of the execution control of the robot arms 51A and 51B based on the operation plan, and generates the operation sequences of the robot arms 51A and 51B based on the predicted state. At the beginning of the execution control, the sorting target items are conveyed within the movement range of either the robot arm 51A or the robot arm 51B by the preceding conveying control, and thus pick-and-place of each sorting target item is executable by at least one of the robot arms 51A and 51B.

In this way, in the example illustrated in FIG. 4B, the control device 1 can appropriately formulate the operation plan even when the state of the sorting target items and any other objects in the workspace at the time point of performing the recognition process and the operation planning differs from the state thereof at the time point of starting the execution control of the robot arms 51A and 51B based on the operation plan. Therefore, in this case, even if the conveying control and the execution control based on the operation plan in the previous cycle have not been completed, it is possible to start the recognition process and the operation planning in the subsequent cycle thereof. Accordingly, the pipeline processing is suitably realized.

In the example shown in FIG. 4C, the conveying control is constantly executed as a background process, and the robot arms 51A and 51B execute pick-and-place of an item 7 being conveyed by the first conveying machine 52A, in principle. In this instance, in the recognition process and the operation planning, the control device 1 predicts the state of the workspace at the time of starting the execution control based on the operation plan, and generates the operation sequences of the robot arms 51A and 51B based on the predicted state. In such cases, the operation planning regarding the robot arms 51A and 51B is performed on the assumption that the sorting target items are moving at a predetermined speed. Then, according to the example shown in FIG. 4C, since it is not necessary to stop the conveyance of the items 7 in each cycle of the recognition process, the operation planning, and the execution control thereof, it is possible to shorten the length of the period per one cycle and expeditiously perform the parts sorting.

Hereinafter, the processing for realizing the pipeline processing as shown in FIG. 4B or FIG. 4C will be specifically described.

(5) Functional Blocks

Figure 5:
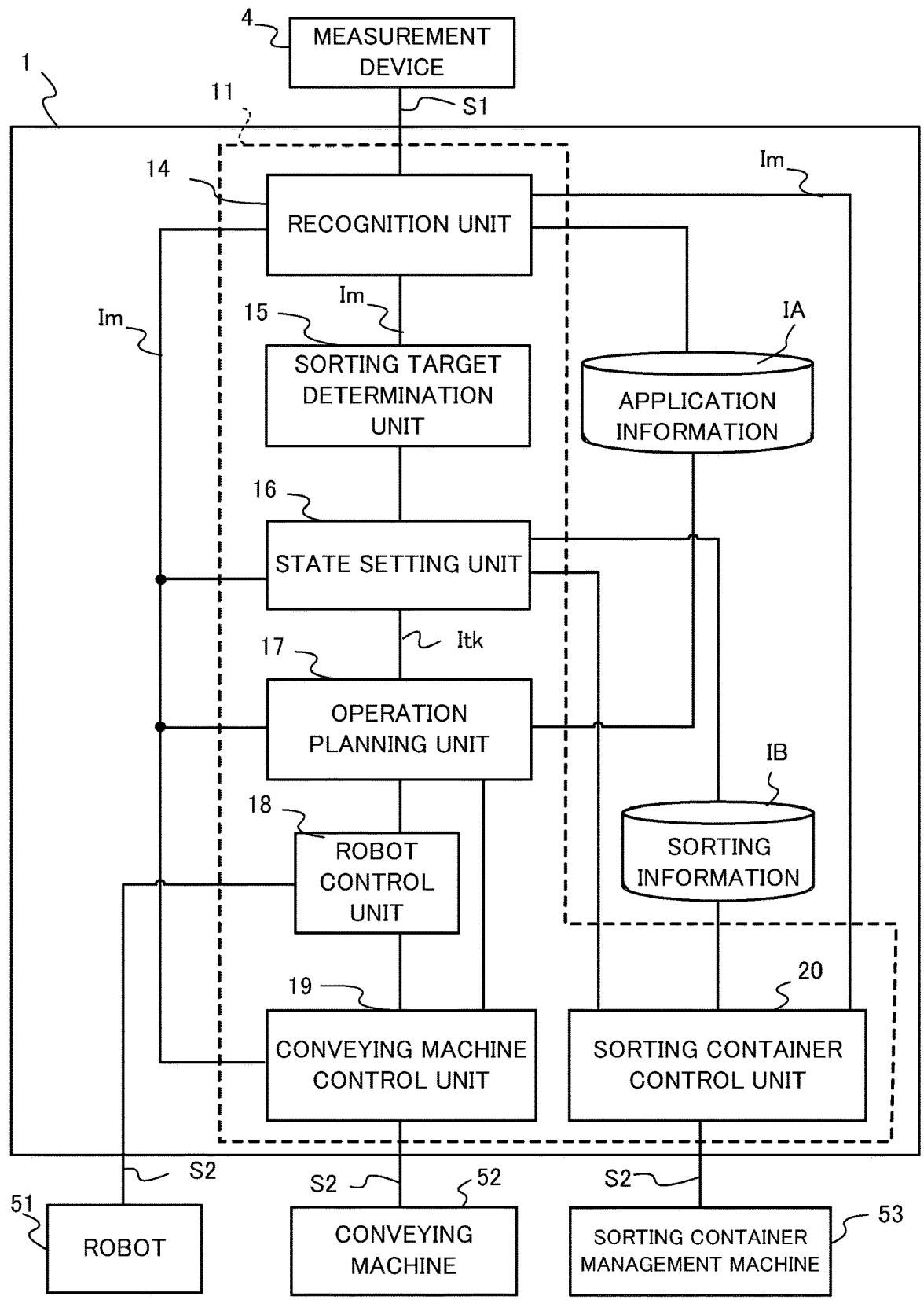
FIG. 5 It is an example of a functional block of the control device.

FIG. 5 is an example of functional blocks showing an outline of the processing of the control device 1. The processor 11 of the control device 1 functionally includes a recognition unit 14, a sorting target determination unit 15, a state setting unit 16, an operation planning unit 17, a robot control unit 18, a conveying machine control unit 19, and a sorting container control unit 20. In FIG. 5, blocks to exchange data with each other are connected by solid line, but the combination of the blocks to exchange data with each other is not limited to the combination shown in FIG. 5. The same applies to the drawings of other functional blocks described below.

The recognition unit 14 generates a recognition result (measurement result) "Im" related to the state of objects in the workspace on the basis of the measurement signal S1 supplied from the measurement device 4. Specifically, when receiving the measurement signal S1, the recognition unit 14 analyzes the measurement signal S1 by an environment recognition technique (such as an image processing technique, an image recognition technique, a speech recognition technique, and a technique of using a RFID (Radio Frequency Identifier)) in the workspace by referring to an object model information I6 of an application information IA or the like. Accordingly, the recognition unit 14 recognizes the number of the objects in the workspace and the position and the posture of each object in the workspace and outputs the recognition result Im. For example, the recognition result Im includes, in the case shown in FIG. 3, information relating to the state of the robot arms 51A and 51B, the number, positions, postures of the items 7, and the number, positions, postures of the sorting containers 8 (including the state of the accommodated item(s) 7). The recognition unit 14 supplies the generated recognition result Im to other functional blocks in the processor 11.

The sorting target determination unit 15 determines the sorting target items based on the recognition result Im outputted by the recognition unit 14. In this instance, the sorting target determination unit 15 sets the sorting target range Rtag as shown in FIG. 3 and determines that the items 7 within the sorting target range Rtag are the sorting target items. Instead of setting the sorting target range Rtag, the sorting target determination unit 15 may determine the sorting target items to be a predetermined number of items 7 selected in the order close to the robot 51 among the items 7 that have not been identified yet as the sorting target items in the operation plans formulated in the past.

The state setting unit 16 predicts the state (also referred to as "predicted start state") of the workspace at the start of execution control of the robot 51 based on the operation plan for the sorting target items determined by the sorting target determination unit 15 and sets the target state that is the state after the sorting of the sorting target items. In this case, the state setting unit 16 sets the target state from the predicted start state, on the basis of the recognition result Im, the sorting information IB, the moving speed of the sorting target items (i.e., the conveying speed of the conveying machine 52 for conveying the sorting target items) or predicted moving distance, and an unfinished operation plan (including the plan of unloading and replenishing the sorting containers 8) in the previous cycle. Here, the objective task corresponds to the task that realizes the target state from the predicted start state, and is uniquely determined by the predicted start state and the target state. The state setting unit 16 supplies the state setting information "Itk" related to the predicted start state and the target state to the operation planning unit 17.

Based on the state setting information Itk, the application information IA, and the recognition result Im, the operation planning unit 17 generates the operation sequence of the robot 51 regarding pick-and-place for moving the sorting target items to the sorting containers 8 according to the classification of the sorting target items. The operation planning unit 17 supplies the generated operation sequence to the robot control unit 18. Here, the operation sequence includes information indicating the execution order and execution timing of each subtask.

The robot control unit 18 sends the control signal S2 to the robot 51 to thereby control the robot 51 so that the robot 51 operates according to the operation plan determined by the operation planning unit 17. Specifically, the robot control unit 18 performs the control (e.g., position control or torque control of the joints of the robot 51) so that the robot 51 executes each subtask, which constitutes the operation sequence generated by the operation planning unit 17, at each predetermined execution timing (time step).

The robot 51 may be equipped with the function corresponding to the robot control unit 18 in place of the control device 1. In this instance, the robot 51 receives the control signal S2 representing the operation sequence generated by the operation planning unit 17, and performs position control, torque control, or the like of the joints for realizing the operation sequence.

The conveying machine control unit 19 performs the conveying control of conveying the items 7 by the conveying machine 52 by transmitting the control signal S2 to the conveying machine 52. For example, in the pipeline processing illustrated in FIG. 4B, the conveying machine control unit 19 controls the conveying machine 52 to move the items 7 by a predetermined distance assumed in the recognition process and the operation planning after the recognition processing and the operation planning are completed (that is, after receiving the notification of the determination of the operation plan from the operation planning unit 17). Meanwhile, in the pipeline processing illustrated in FIG. 4C, the conveying machine control unit 19 controls the conveying machine 52 to move the items 7 at a constant speed, in principle. The conveying machine control unit 19 may control the conveying machine 52 to decelerate the conveyance of the items 7 during the operation period of the robot 51 based on the operation plan, or may control the conveying machine 52 to decelerate or stop the conveyance of the items 7 when a predetermined exceptional event is detected. In the latter instance, for example, based on the recognition result Im or the like, the conveying machine control unit 19 may recognize the progress of the operation plan formulated by the operation planning unit 17, and control the conveying machine 52 to decelerate or stop the conveyance of the items 7 if the progress is behind the operation plan determined by the operation planning unit 17. Thus, the conveying machine control unit 19 may perform control of the conveying machine 52 based on the state of the sorting operation.

The sorting container control unit 20 performs control relating to the unloading and replenishment of the sorting containers 8. In the example shown in FIG. 3, if a predetermined condition is satisfied, the sorting container control unit 20 controls, based on the control signal S2, the replenishment management machine 54A and the unloading management machine 54B to transfer a sorting container 8 to the second conveying machine 52B and load a new sorting container 8. Hereinafter, the sorting containers 8 (in FIG. 3, the sorting containers 8A to 8D) each existing at a position to be a candidate for the sorting destination of the item 7 grasped by the robots 51 are also referred to as "target sorting containers 8".

Here, a specific example of the processing of the sorting container control unit 20 will be described with reference to the example shown in FIG. 3. In the first example of unloading and replenishment of the sorting containers 8, if there is a sorting container 8 in a state (referred to as "reference state") where any further item 7 cannot be accommodated therein, the sorting container control unit 20 identifies the sorting container 8 as a target to be unloaded. Then, the sorting container control unit 20 controls the unloading management machine 54B to transfer the sorting container 8 to the second conveying machine 52B, and controls the replenishment management machine 54A to load a new sorting container 8. In this case, the sorting container control unit 20 may determine whether or not the sorting container 8 is in the reference state, either based on the measurement signal S1 or recognition result Im, or based on the progress of the operation plan managed by the robot control unit 18. In the former determination method, for example, the sorting container control unit 20 recognizes the type and the number of items 7 accommodated in the sorting container 8 of interest based on the measurement signal S1 or recognition result Im, thereby to determine whether or not the number of accommodated items 7 has reached the accommodation upper limit number corresponding to the recognized type. In this case, for example, the memory 12 or the like stores in advance information regarding the accommodation upper limit number of the sorting container 8 for each type of the items 7 described above. In the latter determination method, the sorting container control unit 20 estimates, based on the progress of the operation plan formulated by the operation planning unit 17, the type and the number of the items 7 placed in the sorting container 8 at the current time, and then compares the estimation result with information regarding the above-described accommodation upper limit, thereby to determine whether or not the sorting container 8 is in the reference state.

In the second example of unloading and replenishment of the sorting containers 8, if a sorting target item belongs to a new class which does not corresponds to any of the sorting containers 8A to 8D placed on the unloading management machines 54B, the sorting container control unit 20 determines that there is no candidate for the sorting destination of the sorting target item. For example, if the sorting container control unit 20 determines, based on the identification information of the sorting target items, and the sorting information IB, that any one of the sorting target items belongs to a class differing from the items 7 accommodated in the sorting container 8A to 8D (and the sorting containers 8A to 8D are not empty), the sorting container control unit 20 determines that there is no candidate for the sorting destination. Then, the sorting container control unit 20 transfers one of the sorting containers 8A to 8D to the second conveying machine 52B and then performs control to replenish the unloading management machine 54B with a new sorting container 8. In this case, for example, the sorting container control unit 20 selects, as the target to be transferred to the second conveying machine 52B, the sorting container 8 having the largest number or ratio (i.e., the ratio of the actual accommodation number to the accommodation upper limit number) of the accommodated items 7 among the sorting containers 8A to 8D. In this way, the sorting container control unit 20 suitably controls the unloading and replenishment of the sorting container 8 to properly sort the items 7 while minimizing the number of sorting containers 8 to be used.

The determination as to whether or not to unload and replenish the sorting containers 8 described above may be made in the process of setting the target state by the state setting unit 16. In this case, the sorting container control unit 20 executes the unloading and replenishment of the sorting containers 8 in response to the request of the unloading and replenishment of the sorting containers 8 from the state setting unit 16. The determination as to whether or not to unload and replenish the sorting containers 8 at the time of setting the target state will be described in the section "(6) Processing in State Setting Unit".

Here, for example, each component of the recognition unit 14, the sorting target determination unit 15, the state setting unit 16, the operation planning unit 17, the robot control unit 18, the conveying machine control unit 19 and the sorting container control unit 20 can be realized by the processor 11 executing a program. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. Further, at least a part of the components may be configured by a ASSP (Application Specific Standard Produce), ASIC (Application Specific Integrated Circuit) and/or a quantum processor (quantum computer control chip). In this way, each component may be implemented by a variety of hardware. The above is true for other example embodiments to be described later. Further, each of these components may be realized by the collaboration of a plurality of computers, for example, using cloud computing technology.

(6) Processing in State Setting Unit

First, the prediction of the predicted start state by the state setting unit 16 will be described. The state setting unit 16 predicts, as the predicted start state, at least, the state of the sorting target items and the target sorting containers 8 at the time of the start of the execution control.

First, the prediction of the state of the sorting target items at the start of the execution control will be described. The state setting unit 16 predicts the state (e.g., the position and the posture) of the sorting target items at the time of the start of the execution control, based on, for example, the present state (e.g., the position and the posture) of the sorting target items indicated by the recognition result Im, the conveying speed of the items 7 by the conveying machine 52, and the time length until the start of the execution control of the operation plan. In the first embodiment of the pipeline processing illustrated in FIG. 4B, when the movement distance by the conveying control after the operation plan is predetermined, the state setting unit 16 may recognize the state of the sorting target items at the time of starting the execution control based on the information regarding the movement distance and the present state of the sorting target items indicated by the recognition result Im.

Next, the prediction of the state of the target sorting containers 8 at the start of the execution control will be described. As shown in FIGS. 4B and 4C, at the time of the recognition process and the operation planning, there is a case where the execution control in the previous cycle is not completed, and there is a possibility that an increase in the items 7 stored in the target sorting containers 8 (the sorting containers 8A to 8D in FIG. 3) or unloading and replenishment of the target sorting containers 8 occurs by the time of starting the execution of the operation plan in the current cycle. Therefore, for example, based on the information regarding the operation plan (operation sequence) determined by the operation planning unit 17 in the previous cycle, the state setting unit 16 predicts the accommodation state of each target sorting container 8 at the start time of the execution control. Further, for example, when the state setting unit 16 receives from the sorting container control unit 20 information regarding whether or not there is a plan to carry out the unloading and replenishment of the sorting containers 8 during a period from the time of the recognition process and the operation planning to the start time of the execution control, the state setting unit 16 determines whether or not there is a state change (including changes in arrangement) in the target sorting containers 8 caused by the unloading and replenishment of the sorting containers 8. Then, when it is determined that there is a state change in the target sorting containers 8, the state setting unit 16 predicts the state of the target sorting container 8 after the state change. In such a case where there is a regulation that the sorting container control unit 20 should immediately unload and replenish the sorting containers 8 when there is detected a target sorting container 8 in the reference condition, if the state setting unit 16 predicts that there will be a target sorting container 8 in the reference state as a result of the execution control in the previous cycle, the state setting unit 16 determines that unloading and replenishment of the target sorting containers 8 will be performed, and predicts the state of the target sorting containers 8 after the unloading and replenishment.

Next, a description will be given of the setting of the target state by the state setting unit 16. The state setting unit 16 sets a target state on the basis of the predicted start state and the class, on the sorting, of each sorting target item. In this case, the state setting unit 16 determines the target sorting containers 8 to be the sorting destination of the sorting target items, and sets the target state in which the sorting target items are placed in the target sorting containers 8 by pick-and-place.

Here, first, a description will be given of a determination method of the class, on the sorting, of each sorting target item. For example, if the sorting information IB indicates a correspondence relation between the ID of the item and the class on the sorting (e.g., class determined by type or lot number), the state setting unit 16 recognizes the class, on the sorting, of each sorting target item on the basis of the ID of the each sorting target item identified by the reading result by the BCR 43 or the like and the correspondence relation indicated by the sorting information IB. In another example, when the items 7 are sorted by the types of the items 7, the state setting unit 16 recognizes the types of the sorting target items that is identified based on the recognition result of the types of the sorting target items by the camera 41 or the like as the classes of the sorting target items. That is, in this instance, the state setting unit 16 recognizes the classes of the sorting target items without using the sorting informational IB.

Next, a description will be given of a method of determining the target sorting containers 8 to be the sorting destination of each sorting target item based on the predicted start state and the class of each sorting target item by division into cases.

If it is predicted, in the predicted start state, that any item 7 to be the same class as a sorting target item is accommodated in one of the target sorting containers 8, the state setting unit 16 sets the one of the target sorting containers 8 as the sorting destination of the sorting target item. The treatment when the target sorting container 8 identified as the sorting destination is in the reference state will be described later.

Further, if it is predicted, in the predicted start state, that any item 7 having the same sorting destination as the sorting target item is not accommodated in any target sorting containers 8 and there is an empty target sorting container 8, the state setting unit 16 determines that the empty target sorting container 8 is the sorting destination of the sorting target item.

If it is predicted, in the predicted start state, that any item 7 having the same sorting destination as the sorting target item is not accommodated in any target sorting containers 8 and there is no empty target sorting container 8, the state setting unit 16 determines that it is necessary to unload and replenish the target sorting containers 8. Therefore, in this case, the state setting unit 16 supplies the request signal of the unloading and replenishment of the target sorting containers 8 to the sorting container controller 20. In this case, in some embodiments, the state setting unit 16 specifies the start timing of unloading the target sorting container 8 in the above-mentioned request signal so that the target sorting containers 8 are unloaded and replenished after the completion of the execution control in the previous cycle. Then, for example, if the state setting unit 16 detects, based on the replenishment completion notification from the sorting container control unit 53 or the measurement signal S1, that an empty sorting container 8 is loaded, the state setting unit 16 determines that the loaded empty sorting container 8 is the sorting destination of the sorting target item. In another example, the state setting unit 16 may determine the sorting destination of the sorting target item, on the assumption that the target sorting container 8 is unloaded and replenished by the time of the execution control in the current cycle. In this case, the state setting unit 16 re-determines the predicted start state to be a state after the unloading and replenishment of the target sorting containers 8 (i.e., the state after loading the empty target sorting container 8 and changing the arrangement of the other existing target sorting containers 8), and determines the sorting destination of the sorting target item based on the re-determined predicted start state.

Further, if it is predicted, in the predicted start state, that the items 7 having the same sorting destination as the sorting target item are already accommodated in one of the target sorting containers 8 and the one of the target sorting containers 8 is in the reference state, the state setting unit 16 determines that it is necessary to unload and replenish the target sorting containers 8. Therefore, in this case, the state setting unit 16 supplies a request signal for unloading the one of the target sorting containers 8 in the reference state and loading a new target sorting container 8 to the sorting container control unit 20. In this case, in some embodiments, the state setting unit 16 may include information which specifies the state timing of unloading the one of the target sorting containers 8 in the above-mentioned request signal so that the unloading and replenishment of the target sorting containers 8 are performed after the completion of the execution control in the preceding cycle. Then, the state setting unit 16 determines that the loaded empty target sorting container 8 is the sorting destination of the sorting target item. It is noted that, if an empty sorting container 8 already exists, the state setting unit 16 may set the target state using the empty target sorting container 8 as the sorting destination and proceed to the formulation of the operation plan.

If the identification information (ID) is assigned to each sorting container 8 and the class (type or lot number) of the item 7 to be accommodated in the each sorting container 8 is specified in the sorting information IB, the state setting unit 16 recognizes the sorting container 8 to be the sorting destination, based on the reading information of the sorting target items by the BCR 43 and the sorting information IB. In this case, each sorting container 8 is equipped with an AR marker or the like and the unique identification information (ID) thereof is identifiable based on the measurement by the camera 41 or the like.

The state setting unit 16 supplies the state setting information Itk representing the predicted start state and the target state to the operation planning unit 17. Accordingly, the operation plan for the objective task specified from the predicted start state and the target state is established, and the operation sequence of the robot 51 for the sorting target items is generated.

(7) Details of Operation Planning

Next, the details of the operation planning regarding the robot 51 by the operation planning unit 17 will be described. In the following, as an example, an approach for generating an operation sequence that is a time-step sequence of subtasks for each of the robot 51 based on the target state represented by temporal logic will be described.

(7-1) Application Information

First, a description will be given of the data structure of the application information IA used in operation planning by the operation planning unit 17.

Figure 6:
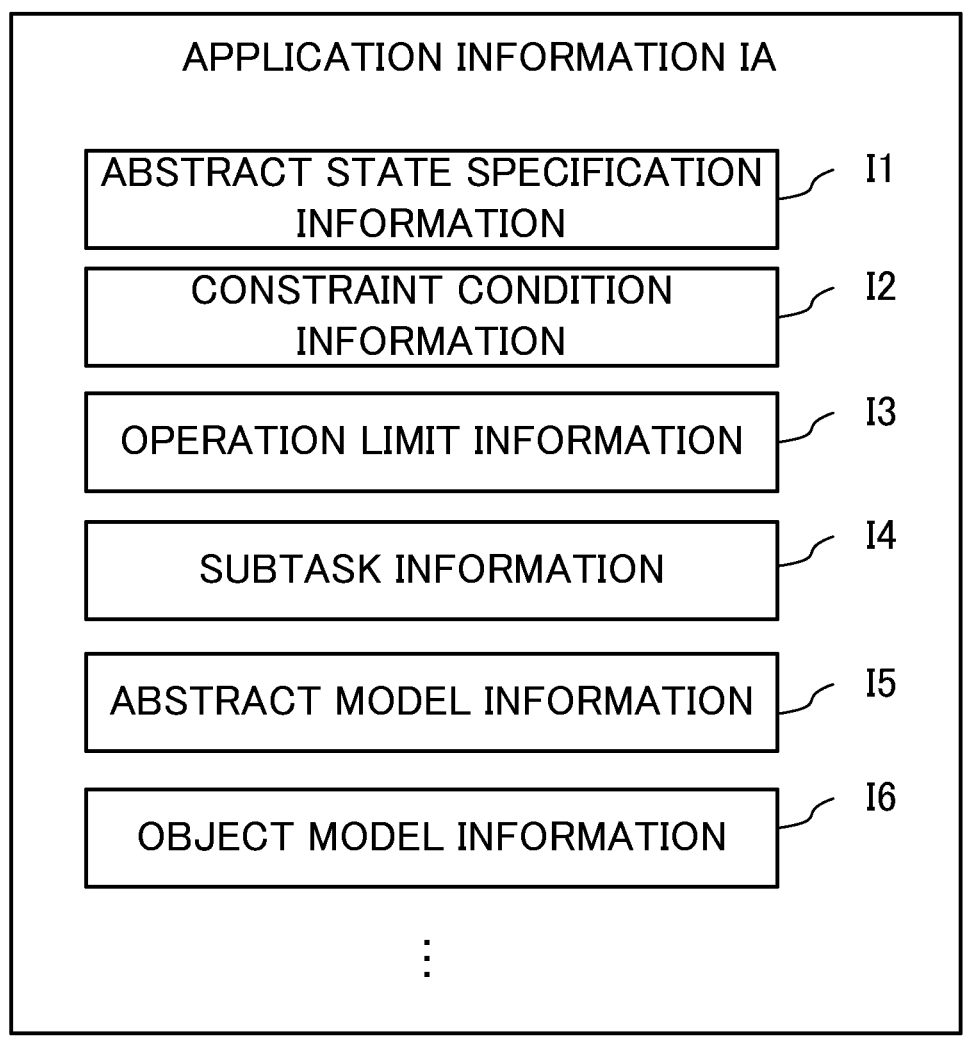
FIG. 6 It is an example of the data structure of application information.

FIG. 6 illustrates an example of the data structure of the application information IA. As shown in FIG. 6, the application information IA includes abstract state specification information I1, constraint condition information I2, operation limit information I3, subtask information I4, abstract model information I5, and object model information I6.

The abstract state specification information I1 specifies an abstract state to be defined in order to generate the operation sequence. The above-mentioned abstract state is an abstract state of an object in the workspace, and is defined as a proposition to be used in the target logical formula to be described later.

The constraint condition information I2 indicates constraint conditions at the time of performing the objective task. The constraint condition information I2 indicates, for example, a constraint that the robot 51 (robot arms) must not be in contact with an obstacle when the objective task is pick-and-place, and a constraint that the robot arms must not be in contact with each other, and the like.

The operation limit information I3 indicates information on the operation limit of the robot 51 to be controlled by the control device 1. The operation limit information I3 is information, for example, defining the upper limits of the speed, the acceleration, and the angular velocity of the robot 51. It is noted that the operation limit information I3 may be information defining the operation limit for each movable portion or joint of the robot 51.

The subtask information I4 indicates information on subtasks that the robot 51 can accept. For example, when the objective task is pick-and-place, the subtask information I4 defines a subtask "reaching" that is the movement of a robot arm of the robot 51, and a subtask "grasping" that is the grasping by the robot arm.

The abstract model information I5 is information on an abstract model in which the dynamics in the workspace are abstracted. For example, an abstract model is represented by a model in which real dynamics are abstracted by a hybrid system, as will be described later. The abstract model Information I5 includes information indicative of the switching conditions of the dynamics in the above-mentioned hybrid system. For example, in the case of pick-and-place in which the robot 51 grasps a target object and then place it on a predetermined position, one of the switching conditions is that the target object cannot be moved unless it is gripped by the hand of the robot arm.

The object model information I6 is information on the object model of each object in the workspace to be recognized from the measurement signal S1 generated by the measurement device 4. Examples of the above-described each object include the robot 51, an obstacle, a tool and any other object handled by the robot 51, a working body other than the robot 51. The object model information I6 includes, for example, information required for the control device 1 to recognize the type, position, posture, currently-executed operation, and the like of the described above each object, and three-dimensional shape information such as CAD (Computer Aided Design) data for recognizing the three-dimensional shape of each object. The former information includes the parameters of an inference engine obtained by training a learning model that is used in a machine learning such as a neural network. For example, the above-mentioned inference engine is preliminarily trained to output the type, the position, the posture, and the like of an object shown in the image when an image is inputted thereto.

The application information IA may store various information related to the generating process of the operation sequence in addition to the above-described information.

(7-2) Functional Blocks of Operation Planning Unit

Figure 7:
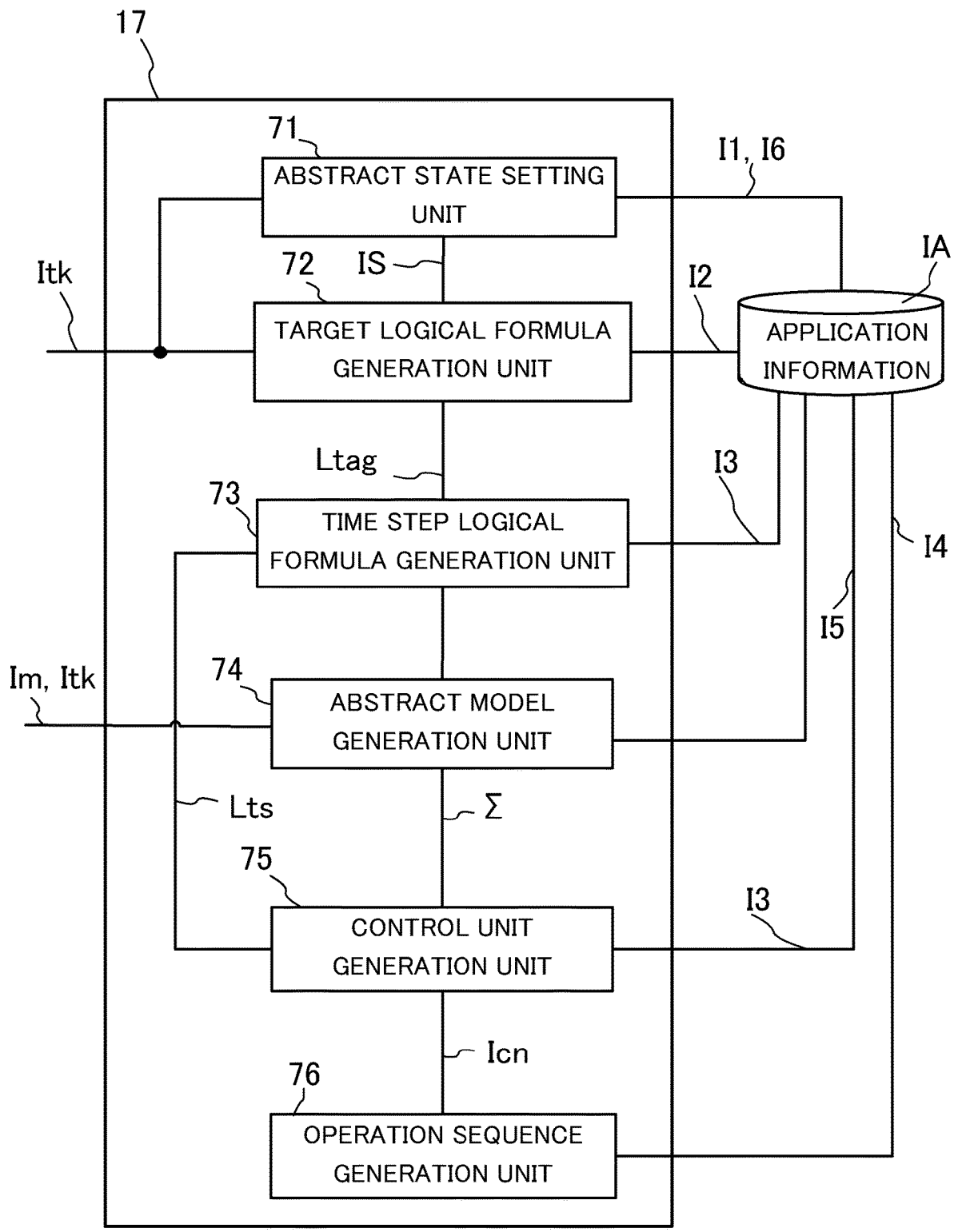
FIG. 7 It is an example of a functional block of an operation planning unit.

FIG. 7 is an example of functional blocks showing an outline of the process executed by the operation planning unit 17. The operation planning unit 17 functionally includes an abstract state setting unit 71, a target logical formula generation unit 72, a time step logical formula generation unit 73, an abstract model generation unit 74, a control input generation unit 75, and an operation sequence generation unit 76.

The abstract state setting unit 71 sets the abstract states in the workspace based on the state setting information Itk and the abstract state specification information I1. In this case, the abstract state setting unit 71 defines propositions, to be used in logical formulas, which represent the abstract states in which the predicted start state indicated by the state setting information Itk is abstractedly represented. The abstract state setting unit 71 supplies information (also referred to as "abstract state setting information IS") representing the set abstract states to the target logical formula generation unit 72.

The target logical formula generation unit 72 converts the objective task identified from the predicted start state and the target state indicated by the state setting information Itk into a logical formula (also referred to as "target logical formula Ltag") in the form of temporal logics representing the final state to be achieved, based on the abstract state setting information IS. In this case, by referring to the constraint condition information I2 of the application information IA, the target logical formula generation unit 72 adds the constraint conditions to be satisfied in executing the objective task to the target logical formula Ltag. The target logical formula generation unit 72 supplies the generated target logical formula Ltag to the time step logical formula generation unit 73.

The time step logical formula generation unit 73 converts the target logical formula Ltag supplied from the target logical formula generation unit 72 into a logical formula (also referred to as "time step logical formula Lts") representing the states at every time step. The time step logical formula generation unit 73 supplies the generated time step logical formula Lts to the control input generation unit 75.

The abstract model generation unit 74 generates an abstract model "$\Sigma$" in which the real dynamics in the workspace is abstracted based on the abstract model information I5 of the application information IA and the recognition result Im supplied from the abstract state setting unit 71. In this case, the abstract model generation unit 74 considers the target dynamics as a hybrid system in which continuous dynamics and discrete dynamics are mixed, and generates the abstract model $\Sigma$ based on the hybrid system. The method of generating the abstract model $\Sigma$ will be described later. The abstract model generation unit 74 supplies the generated abstract model $\Sigma$ to the control input generation unit 75.

The control input generation unit 75 determines a control input to the robot 51 for each time step so that the time step logic formula Lts supplied from the time step logical formula generation unit 73 and the abstract model $\Sigma$ supplied from the abstract model generation unit 74 are satisfied and so that the evaluation function (e.g., a function representing the amount of energy consumed by the robot) is optimized. The control input generation unit 75 supplies information (also referred to as "control input information Icn") indicating the control input to the robot 51 at each time step to the operation sequence generation unit 76.

The operation sequence generation unit 76 generates an operation sequence which is a sequence of subtasks on the basis of the control input information Icn supplied from the control input generation unit 75 and the subtask information I4 of the application information IA and supplies the operation sequence to the robot 51.

(7-3) Abstract State Setting Unit

Based on the state setting information Itk and the abstract state specification information I1 of the application information IA, the abstract state setting unit 71 sets the abstract states of the predicted start state in the workspace. In this case, first, the abstract state setting unit 71 refers to the abstract state specification information I1, and recognizes the abstract states to be set in the workspace.

Figure 8:
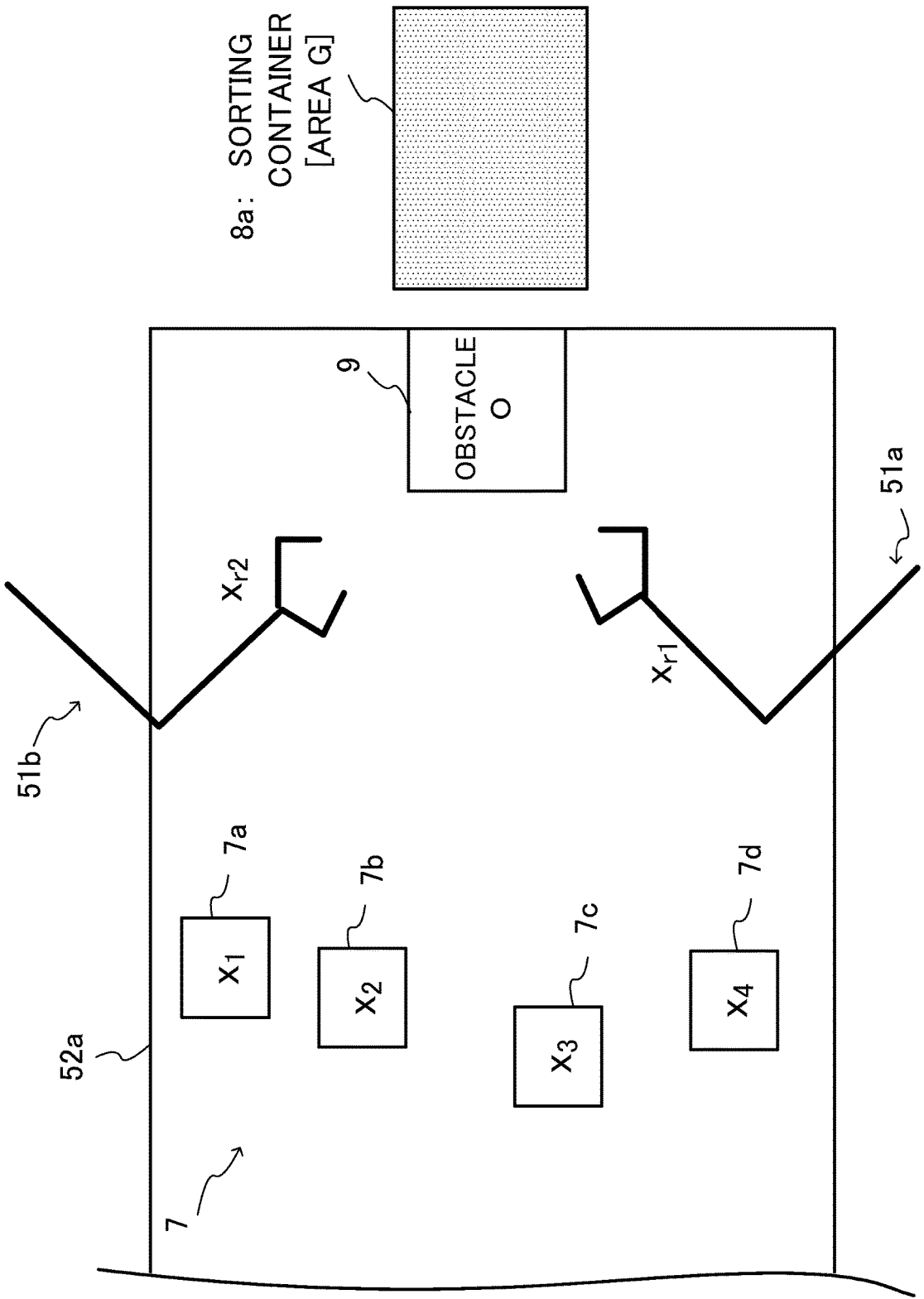
FIG. 8 It is an example of a bird's-eye view of a workspace of a pick-and-place that is a simplified work of sorting separated parts shown in FIG. 3.

FIG. 8 shows a bird's-eye view of the workspace of pick-and-place which is a simplified work of parts-sorting work shown in FIG. 3. In the workspace shown in FIG. 8, there are two robot arms 51a and 51b, four sorting target items 7a to 7d, an obstacle 9, and a sorting container 8a which is the destination of the sorting target items 7a to 7d. The position of each object including the sorting target items 7a to 7d is a predicted position in the predicted start state specified based on the state setting information Itk. In FIG. 8, only one sorting container 8 (the sorting container 8a) is illustrated for simplicity of explanation. Hereafter, the inner area of the sorting container 8a on which the sorting target items 7a to 7d should be placed is also referred to as "area G".

First, the abstract state setting unit 71 recognizes each predicted starting state regarding the sorting target items 7a to 7d, the obstacle 9, the robot 51, the area G, and the like, on the basis of the state setting information Itk.

Here, the abstract state setting unit 71 recognizes the position vectors "$x_1$" to "$x_4$" of the respective centers of the sorting target items 7a to 7d as the positions of the sorting target items 7a to 7d. The abstract state setting unit 71 recognizes the position vector "$x_{r1}$" of the robot hand of the robot arm 51a and the position vector "$x_{r2}$" of the robot hand of the robot arm 51b as the positions of the robot arm 51a and the robot arm 51b. If the sorting target items 7a to 7d are conveyed by the first conveying machine 52A at a predetermined conveying speed, the abstract state setting unit 71 may represent the position vectors $x_1$ to $x_4$ by a predetermined model (function) that uses the initial positions indicated by the recognition result Im, the transport speed of the first conveying machine 52A, and the elapsed time from the initial positions as parameters. The information regarding the above-described model (function) is previously included in the application information IA, for example. Further, when the control device 1 stops the conveying by the first conveying machine 52A during operation planning and the operation of the robot 51, the abstract state setting unit 71 determines the position vectors $x_1$ to $x_4$ to be the positions in the predicted start state.

The abstract state setting unit 71 determines the abstract states to be defined in the objective task by referring to the abstract state specification information I1. In this instance, the abstract state setting unit 71 determines propositions indicating the abstract states, based on the recognition result Im (e.g., the number of objects for each type) relating to the objects existing in the workspace and the abstract state specification information I1.

In the example shown in FIG. 8, the abstract state setting unit 71 adds identification labels "1" to "4" to items 7a to 7d specified by the recognition result Im, respectively. The abstract state setting unit 71 defines a proposition "$g_i$" that the item "i" (i=1 to 4) is present in the area G which is the goal point to be finally placed. Further, the abstract state setting unit 71 adds an identification label "O" to the obstacle 9, and defines a proposition "$o_i$" that the item i interferes with the obstacle O. Furthermore, the abstract state setting unit 71 defines the proposition "h" that the robot arms 51a and 51b interfere with each other.

In this way, the abstract state setting unit 71 recognizes the abstract states to be defined by referring to the abstract state specification information I1, and defines propositions representing the abstract states ($g_i$, $o_i$, h in the above-described example) according to the number of items 7, the number of robots 51, the number of obstacles 9, etc., respectively. The abstract state setting unit 71 supplies information indicating the propositions representing the abstract states to the target logical formula generation unit 72 as the abstract state setting information IS.

(7-4) Target Logical Formula Generation Unit

First, the target logical formula generation unit 72 converts the objective task represented by the state setting information Itk into a logical formula in the form of temporal logics.

For example, in the example of FIG. 8, it is herein assumed that the objective task "the sorting target item (i=2) finally exists in the area G" is given. In this case, the target logical formula generation unit 72 generates the logical formula "♦$g_2$" which represents the objective task by using the operator "♦" corresponding to "eventually" of the linear logical formula (LTL: Linear Temporal Logic) and the proposition "$g_i$" defined by the abstract state setting unit 71. The target logical formula generation unit 72 may express the logical formula by using any operators according to the temporal logic other than the operator "♦" such as logical AND "∧", logical OR "∨", negative "¬", logical implication "⇒", always "□", next "∘", and until "U". The logical formula may be expressed by any temporal logic other than linear temporal logic such as MTL (Metric Temporal Logic) and STL (Signal Temporal Logic).

Next, the target logical formula generation unit 72 generates the target logical formula Ltag by adding the constraint conditions indicated by the constraint condition information I2 to the logical formula indicating the objective task.

For example, provided that two constraint conditions "a robot arm does not interfere with another robot arm" and "the sorting target item i does not interfere with the obstacle O" for pick-and-place shown in FIG. 8 are included in the constraint condition information I2, the target logical formula generation unit 72 converts these constraint conditions into the logical formula. Specifically, the target logical formula generation unit 72 converts the above-described two constraint conditions into the following logical formulas, respectively, using the proposition "$o_i$" and the proposition "h" defined by the abstract state setting unit 71 in the case shown in FIG. 8.

□¬h

∧$_i$□¬$o_i$

Therefore, in this case, the target logical formula generation unit 72 generates the following target logical formula Ltag obtained by adding the logical formulas of these constraint conditions to the logical formula "♦$g_2$" corresponding to the objective task "the sorting target item (i=2) finally exists in the area G".

(♦$g_2$)∧(□¬h)∧(∧$_i$□¬$o_i$)

In practice, the constraint conditions corresponding to the pick-and-place is not limited to the above-described two constraint conditions and there are other constraint conditions such as "a robot arm does not interfere with the obstacle O", "plural robot arms do not grasp the same item", "items do not contact with each other". Such constraint conditions are also stored in the constraint condition information I2 and are reflected in the target logical formula Ltag.

(7-5) Time Step Logical Formula Generation Unit

The time step logical formula generation unit 73 determines the number of time steps (also referred to as the "target time step number") needed to complete the objective task, and determines possible combinations of propositions representing the states at every time step such that the target logical formula Ltag is satisfied with the target time step number. Since the combinations are normally plural, the time step logical formula generation unit 73 generates the time step logical formula Lts that is a logical formula obtained by combining these combinations by logical OR. Each of the combinations described above is a candidate of a logical formula representing a sequence of operations to be instructed to the robot 51, and therefore it is hereinafter also referred to as "candidate φ".

Here, a description will be given of a specific example of the process executed by the time step logical formula generation unit 73 in the case where the objective task "the sorting target item (i=2) finally exists in the area G" exemplified in FIG. 8 is set.

In this instance, the following target logical formula Ltag is supplied from the target logical formula generation unit 72 to the time step logical formula generation unit 73.

(♦$g_2$)∧(□¬h)∧(∧$_i$□¬$o_i$)

In this case, the time-step logical formula generation unit 73 uses the proposition "$g_{i,k}$" that is the extended proposition "$g_i$" to include the concept of time steps. Here, the proposition "$g_{i,k}$" is the proposition "the sorting target item i exists in the area G at the time step k". Here, when the target time step number is set to "3", the target logical formula Ltag is rewritten as follows.

$$(\diamond g_{2,3}) \wedge (\wedge_{k=1,2,3} \square \neg h_k) \wedge (\wedge_{i,k=1,2,3} \square \neg o_{i,k})$$

♦$g_{2,3}$ can be rewritten as shown in the following expression.

[Formula 1]

$$\Diamond g_{2,3} = (\neg g_{2,1} \wedge \neg g_{2,2} \wedge g_{2,3}) \vee$$
$$(\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The target logical formula Ltag described above is represented by logical OR ($\varphi_1 \vee \varphi_2 \vee \varphi_3 \vee \varphi_4$) of four candidates "$\varphi_1$" to "$\varphi_4$" as shown in below.

[Formula 2]

$$\phi_1 = (\neg g_{2,1} \wedge \neg g_{2,2} \wedge g_{2,3}) \wedge (\wedge_{k=1,2,3} \Box\neg h_k) \wedge (\wedge_{i,k=1,2,3} \Box\neg o_{i,k})$$

$$\phi_2 = (\neg g_{2,1} \wedge g_{2,2} \wedge g_{2,3}) \wedge (\wedge_{k=1,2,3} \Box\neg h_k) \wedge (\wedge_{i,k=1,2,3} \Box\neg o_{i,k})$$

$$\phi_3 = (g_{2,1} \wedge \neg g_{2,2} \wedge g_{2,3}) \wedge (\wedge_{k=1,2,3} \Box\neg h_k) \wedge (\wedge_{i,k=1,2,3} \Box\neg o_{i,k})$$

$$\phi_4 = (g_{2,1} \wedge g_{2,2} \wedge g_{2,3}) \wedge (\wedge_{k=1,2,3} \Box\neg h_k) \wedge (\wedge_{i,k=1,2,3} \Box\neg o_{i,k})$$

Therefore, the time step logical formula generation unit 73 determines the time step logical formula Lts to be the logical OR of the four candidates $\varphi_1$ to $\varphi_4$. In this case, the time step logical formula Lts is true if at least one of the four candidates $\varphi_1$ to $\varphi_4$ is true.

Next, a supplementary description will be given of a method of setting the target time step number.

For example, the time step logical formula generation unit 73 determines the target time step number based on the prospective work time specified by the instruction signal D1 supplied from the instruction device 2. In this case, the time step logical formula generation unit 73 calculates the target time step number based on the prospective work time described above and the information on the time width per time step stored in the memory 12 or the storage device 4. In another example, the time step logical formula generation unit 73 stores in advance in the memory 12 or the storage device 4 information in which a suitable target time step number is associated with each type of objective task, and determines the target time step number in accordance with the type of objective task to be executed by referring to the information.

In some embodiments, the time step logical formula generation unit 73 sets the target time step number to a predetermined initial value. Then, the time step logical formula generation unit 73 gradually increases the target time step number until the time step logical formula Lts which enables the control input generation unit 75 to determine the control input is generated. In this case, if the control input generation unit 75 ends up not being able to derive the optimal solution in the optimization processing with the set target time step number, the time step logical formula generation unit 73 adds a predetermined number (1 or more integers) to the target time step number.

(7-6) Abstract Model Generation Unit

The abstract model generation unit 74 generates the abstract model 2 based on the abstract model information I5, the recognition result Im, and the predicted start state represented by the state setting information Itk. Here, in the abstract model information I5, information required to generate the abstract model 2 is recorded. For example, a general-purpose abstract model is recorded in the abstract model information I5, wherein the positions and/or the number of the sorting target items, the position of the area where the sorting target items are to be placed, the number of robots 51, and the like are not specified in the general-purpose abstract model. The abstract model generation unit 74 generates the abstract model 2 by reflecting the recognition result Im (and predicted start state indicated by the state setting information Itk) in the general-purpose abstract model which includes the dynamics of the robot 51 and which is recorded in the abstract model information I5. Thereby, the abstract model 2 is set to a model in which the states of objects existing in the workspace and the dynamics of the robot 51 are abstractly expressed. The states of the objects existing in the workspace indicate the position and the number of the sorting target items, the position of the area (sorting container 8) where the sorting target items are to be placed, the number of robots 51, and the like.

When there are one or more other working bodies to be controlled other than the robot 51, information on the abstracted dynamics of the other working bodies may be included in the abstract model information I5. In this case, the abstract model 2 is a model in which the states of the objects being in the workspace, the dynamics of the robot 51, and the dynamics of the other working bodies are abstractly expressed.

Here, at the time of work of the objective task by the robot 51, the dynamics in the workspace is frequently switched. For example, while the robot arm is gripping the sorting target item i, the sorting target item i can be moved. However, if the robot arm is not gripping the sorting target item i, the sorting target item i cannot be moved.

In view of the above, in the present example embodiment, the operation of grasping the sorting target item i is abstractly expressed by the logical variable "$\delta_i$". In this case, for example, the abstract model generation unit 74 can define the abstract model Σ to be set for the workspace shown in FIG. 8 as the following equation (1).

[Formula 3]

$$\begin{bmatrix} x_{r1} \\ x_{r2} \\ x_1 \\ \vdots \\ x_4 \end{bmatrix}_{k+1} = I \begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix} \begin{bmatrix} u_1 \\ u_2 \end{bmatrix} \quad (1)$$

$$h_{ij_{min}}(1 - \delta_i) \leq h_{ij}(x) \leq h_{ij_{max}} \delta_i + (\delta_i - 1)\varepsilon$$

Here, "$u_j$" indicates a control input for controlling the robot hand j ("j=1" is the robot hand of the robot arm 51a, "j=2" is the robot hand of the robot arm 51b), and "I" indicates a unit matrix and "0" indicates zero (null) matrix. It is noted that the control input is herein assumed to be a speed as an example but it may be an acceleration. Further, "$\delta_{j,i}$" is a logical variable that is set to "1" when the robot hand j grasps the sorting target item i and is set to "0" in other cases. Each of "$x_{r1}$" and "$x_{r2}$" indicates the position vector of the robot hand j (j=1, 2), and each of "$x_1$" to "$x_4$" indicates the position vector of the sorting target item i (i=1 to 4). Further, "h (x)" is a variable to be "h (x)>=0" when the robot hand exists in the vicinity of an item to the extent that it can grasp the item, and satisfies the following relationship with the logical variable $\delta$.

$$\delta = 1 \Leftrightarrow h(x) \geq 0$$

In the above expression, when the robot hand exists in the vicinity of an item to the extent that the item can be grasped, it is considered that the robot hand grasps the item, and the logical variable $\delta$ is set to 1.

Here, the equation (1) is a difference equation showing the relationship between the states of the objects at the time step k and the states of the objects at the time step k+1. Then, in the above equation (1), the state of grasping is represented by a logical variable that is a discrete value, and the movement of any object is represented by a continuous value. Accordingly, the equation (1) shows a hybrid system.

The equation (1) considers not the detailed dynamics of the entire robot 51 but only the dynamics of the robot hand, which is the hand of the robot 51 that actually grasps an item. Thus, it is possible to suitably reduce the calculation amount of the optimization process by the control input generation unit 75.

Further, the abstract model information I5 includes: information for deriving the difference equation indicated by the equation (1) from the recognition result Im (and predicted start state); and the logical variable corresponding to the operation (the operation of grasping the sorting target item i in the case of pick-and-place) causing the dynamics to switch. Thus, even when there is a variation in the position and the number of the sorting target items, the area (sorting container 8) where the sorting target items are to be placed and the number of the robots 51 and the like, the abstract model generation unit 74 can determine the abstract model 2 in accordance with the environment of the target workspace based on the abstract model information I5 and the recognition result Im (and the predicted start state).

It is noted that, in place of the model shown in the equation (1), the abstract model generation unit 74 may generate any other hybrid system model such as mixed logical dynamical (MLD) system and a combination of Petri nets and automaton.

(7-7) Control Input Generation Unit

The control input generation unit 75 determines the optimal control input for the robot 51 with respect to each time step based on the time step logical formula Lts supplied from the time step logical formula generation unit 73 and the abstract model 2 supplied from the abstract model generation unit 74. In this case, the control input generation unit 75 defines an evaluation function for the objective task and solves the optimization problem of minimizing the evaluation function while setting the abstract model 2 and the time step logical formula Lts as constraint conditions. For example, the evaluation function is predetermined for each type of the objective task and stored in the memory 12 or the storage device 4.

For example, when the objective task is pick-and-place, the control input generation unit 75 determines the evaluation function such that the control input "$u_k$" and the distance "$d_k$" between the item to be carried and the goal point of the item are minimized (i.e., the energy spent by the robot 51 is minimized). The distance $d_k$ described above corresponds to the distance between the sorting target item (i=2) and the area G when the objective task is "the sorting target item (i=2) finally exists in the area G".

In this case, the control input generation unit 75 determines the evaluation function to be the sum of the square of the distance $d_k$ and the square of the control input $u_k$ in all time steps. Then, the control input generation unit 75 solves the constrained mixed integer optimization problem shown in the following expression (2) while setting the abstract model $\Sigma$ and the time-step logical formula Lts (that is, the logical OR of the candidates $\varphi_i$) as the constraint conditions.

[Formula 4]

$$\min_u \left( \sum_{k=0}^{T} (\|d_k\|_2^2 + \|u_k\|_2^2) \right) \quad (2)$$

$$\text{s.t.} \sum$$

$$\vee \phi_i$$

Here, "T" is the number of time steps to be set in the optimization and it may be a target time step number or may be a predetermined number smaller than the target time step number as described later. In some embodiments, the control input generation unit 75 approximates the logical variable to a continuous value (i.e., solve a continuous relaxation problem). Thereby, the control input generation unit 75 can suitably reduce the calculation amount. When STL is adopted instead of linear temporal logic (LTL), it can be described as a nonlinear optimization problem. By such optimization, the control input to define the operations of the robots 51 including the handover of the sorting target item 7 between the robots 51 as required is determined.

Further, if the target time step number is large (e.g., larger than a predetermined threshold value), the control input generation unit 75 may set the time step number T in the expression (2) used for optimization to a value (e.g., the threshold value described above) smaller than the target time step number. In this case, the control input generation unit 75 sequentially determines the control input $u_k$ by solving the optimization problem based on the expression (2), for example, every time a predetermined number of time steps elapses.

In some embodiments, the control input generation unit 75 may solve the optimization problem based on the expression (2) for each predetermined event corresponding to the intermediate state for the accomplishment state of the objective task and determine the control input $u_k$ to be used. In this case, the control input generation unit 75 determines the time step number T in the expression (2) to be the number of time steps up to the next event occurrence. The event described above is, for example, an event in which the dynamics switches in the workspace 6. For example, when pick-and-place is the objective task, examples of the event include "the robot 51 grasps the sorting target item" and "the robot 51 finishes carrying one of the sorting target items to the destination (goal) point." For example, one or more events are predetermined, and information indicative of the events is stored in the storage device 4.

(7-8) Operation Sequence Generation Unit

The operation sequence generation unit 76 generates the operation sequence based on the control input information Icn supplied from the control input generation unit 75 and the subtask information I4 stored in the application information storage unit 41. In this case, by referring to the subtask information I4, the operation sequence generation unit 76 recognizes subtasks that the robot 51 can accept and converts the control input for every time step indicated by the control input information Icn into subtasks.

For example, in the subtask information I4, there are defined functions representing two subtasks, the movement (reaching) of the robot hand and the grasping by the robot hand, as subtasks that can be accepted by the robot 51 when the objective task is pick-and-place. In this case, the function "Move" representing the reaching is, for example, a function that uses the following three arguments (parameters): the initial state of the robot 51 before the function is executed; the final state of the robot 51 after the function is executed; and the time to be required for executing the function. In addition, the function "Grasp" representing the grasping is, for example, a function that uses the following these arguments: the state of the robot 51 before the function is executed; the state of the sorting target item to be grasped before the function is executed; and the logical variable $\delta$. Here, the function "Grasp" indicates performing a grasping operation when the logical variable $\delta$ is "1", and indicates performing a releasing operation when the logical variable $\delta$ is "0". In this case, the operation sequence generation unit 76 determines the function "Move" based on the trajectory of the robot hand determined by the control input for every time step indicated by the control input information Icn, and determines the function "Grasp" based on the transition of the logical variable $\delta$ in units of time step indicated by the control input information Icn.

Then, the operation sequence generation unit 76 generates the operation sequence configured by the function "Move" and the function "Grasp", and supplies the operation sequence to the robot 51. For example, if the objective task is "the sorting target item (i=2) finally exists in the area G", the operation sequence generation unit 76 generates the operation sequence of the function "Move", the function "Grasp", the function "Move", and the function "Grasp" for the robot hand closest to the sorting target item (i=2). In this case, the robot hand closest to the sorting target item (i=2) moves to the position of the sorting target item (i=2) by the function "Move" for the first time, grasps the sorting target item (i=2) by the function "Grasp" for the first time, moves to the area G by the function "Move" for the second time, and places the sorting target item (i=2) in the area G by the function "Grasp" for the second time.

(8) Process Flow

Figure 9:
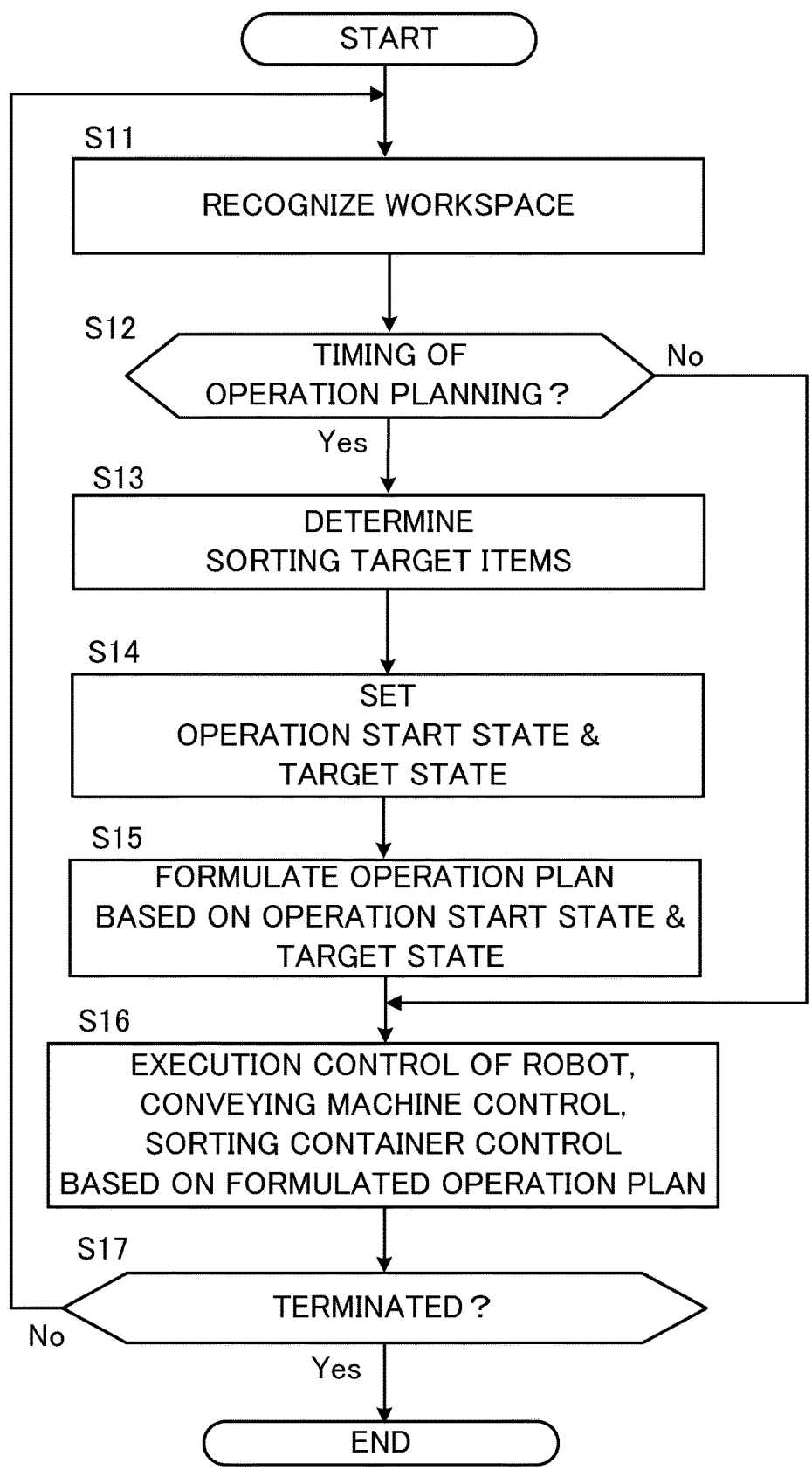
FIG. 9 It is an example of a flowchart showing an outline of a robot control process that the control device executes in the first example embodiment.

FIG. 9 is an example of a flowchart showing an outline of a process to be executed by the control device 1 in the first example embodiment.

First, the control device 1 recognizes information relating to the workspace based on the measurement signal S1 generated by the measurement device 4 (step S11). Thus, the control device 1 generates a recognition result Im. The process at step S11 corresponds to, for example, the process executed by the recognition unit 14 described above.

Next, the control device 1 determines whether or not to perform the operation planning (step S12). For example, if the control device 1 performs the operation planning at predetermined time intervals, the control device 1 determines whether or not a predetermined time has elapsed from the preceding operation planning. Then, if the operation planning is to be performed (step S12; Yes), the control device 1 proceeds with the process at step S13. On the other hand, if the operation planning is not to be performed (step S12; No), the control device 1 performs the execution control of the robot 51 based on the formulated operation plan, the control of the conveying machine 52, and the control of the sorting container management machine 53 (step S16). Thus, the control device 1 suitably performs control so that the formulated operation plan is executed.

Then, if the operation planning is to be performed, the control device 1 determines the sorting target items (step S13). The process at step S13, for example, corresponds to the process executed by the sorting target determination unit 15.

Then, the control device 1 sets the predicted start state that is a predicted state at the start of the execution control of the robot 51, and the target state (step S14). The process at step S14, for example, corresponds to the process executed by the state setting unit 16. Then, based on the predicted start state and the target state set at step S14, the control device 1 formulates the operation plan (step S15). The process at step S15, for example, corresponds to the process executed by the operation planning unit 17. Then, the control device 1 performs the execution control of the robot 51 based on the formulated operation plan, the control of the conveying machine 52, and the control of the sorting container management machine 53 (step S16). The control device 1 may perform the execution control of the robot 51, the control of the conveying machine 52, and the control of the sorting container management machine 53 in parallel with other processing step as required.

Then, the control device 1 determines whether or not to terminate the control process of the robot 51 (step S17). For example, if the control device 1 detects an external input or the like to stop the control process of the robot 51, it determines that the control process of the robot 51 should be terminated. If the control device 1 determines that the control process of the robot 51 should be terminated (step S17; Yes), the control device 1 terminates the process of the flowchart. On the other hand, if the control device 1 determines that the control process of the robot 51 should not be terminated (step S17; No), the control device 1 gets back to the process at step S11.

(9) MODIFICATIONS

Next, a description will be given of the modifications of the first example embodiment. The following modifications may be applied in any combination.

First Modification

The block configuration of the operation planning unit 15 shown in FIG. 7 is an example, and various changes may be applied thereto.

For example, information on the candidates q for the sequence of operations to be instructed to the robot 51 is stored in advance in the memory 12, and based on the information, the operation planning unit 15 executes the optimization process to be executed by the control input generation unit 75. Thus, the operation planning unit 15 performs selection of the optimum candidate q and determination of the control input of the robot 51. In this instance, the operation planning unit 15 may not have a function corresponding to the abstract state setting unit 71, the target logical formula generation unit 72, and the time step logical formula generation unit 73. Thus, information on the execution results from a part of the functional blocks in the operation planning unit 15 shown in FIG. 7 may be stored in advance as a part of the application information IA.

In another example, the application information IA includes design information such as a flowchart for designing the operation sequence to complete the objective task in advance, and the operation planning unit 15 may generate the operation sequence by referring to the design information. For example, JP2017-39170A discloses a specific example of executing a task based on a pre-designed task sequence.

Second Modification

The workspace shown in FIG. 3 is an example, and various changes may be made to the workspace shown in FIG. 3. For example, the sorting container management machine 53 may have a mechanism for loading a sorting container 8 for replenishment from the inside to the position where the unloaded target sorting container 8 was present if any one of the target sorting containers 8 thereon is transferred onto the second conveying machine 52B. The application is not limited to the sorting operation of incoming items in a warehouse and examples of the application include the loading work in an assembly manufacturing industry, a food manufacturing industry, or a logistics industry.

Third Modification

The sorting control system 100 may include a warehouse management system (WMS: Warehouse Management System), and the control device 1 may perform processes related to parts sorting in cooperation with the warehouse management system.

Figure 10:
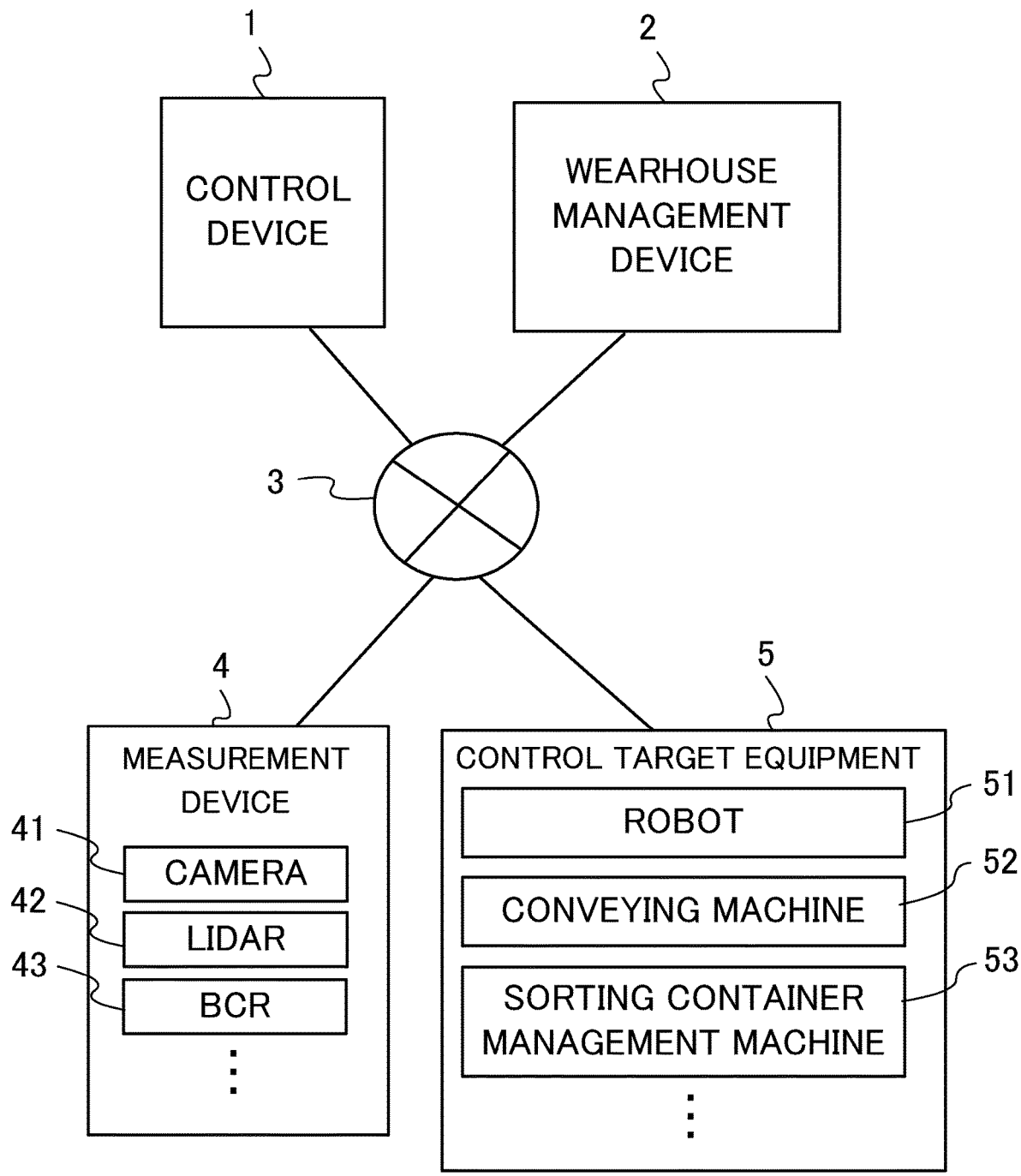
FIG. 10 It is an example of the configuration of the sorting control system in a modification.

FIG. 10 is a schematic configuration diagram of a sorting control system in 100A according to the third modification. As shown in FIG. 10, the sorting control system 100A includes a warehouse management device 2 that manages the information in the warehouse management system. Then, the control device 1 executes the process to be executed by the control device 1 shown in FIG. 1 in cooperation with the warehouse management device 2. For example, the warehouse management device 2 manages the reading result of the bar code by the BCR 43 and the sorting information IB, and the control device 1 detects an item 7 as a sorting target item that has passed through the BCR 43 by the camera 41 or the like and receives information from the warehouse management device 2 regarding the target sorting container 8 to be the sorting destination of the sorting target item. According to this modification, the control device 1 performs data communication with the warehouse management device 2, thereby to determine the target sorting container 8 to be the sorting destination of the sorting target item 7 and suitably formulate the operation plan of the robot 51 based on the above-described example embodiment.

Second Example Embodiment

Figure 11:
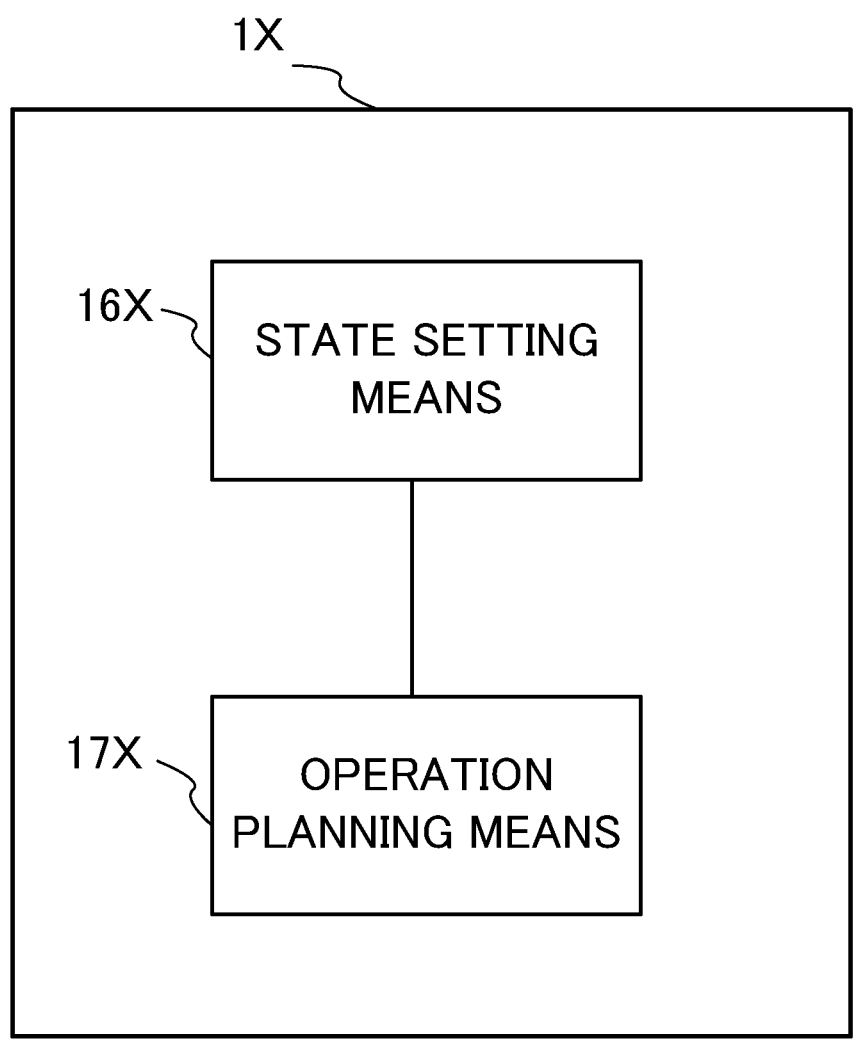
FIG. 11 It is an example of a block configuration of the control device in a second example embodiment.

FIG. 11 is a schematic configuration diagram of a control device 1X in the second example embodiment. As shown in FIG. 11, the control device 1X mainly includes a state setting means 16X and an operation planning means 17X. The control device 1X may be configured by a plurality of devices.

The state setting means 16X is configured to set a predicted start state that is a predicted state of a workspace at a time when a robot starts a work of sorting items and a target state which represents a state where the items are placed in sorting containers by the work, based on information regarding the items and the sorting containers. Examples of the "information on the items and the sorting containers" include the recognition-result Im regarding the items 7 and the sorting containers 8 and the sorting information IB in the first example embodiment. Examples of the state setting means 16X include the state setting unit 16 in the first example embodiment.

The operation planning means 17X is configured to determine an operation plan of the robot based on the predicted start state and the target state. Examples of the operation planning means 17X include the operation planning unit 17 in the first example embodiment.

FIG. 12 illustrates an example of a flowchart to be executed by the control device 1X in the second example embodiment. First, The state setting means 16X sets a predicted start state that is a predicted state of a workspace at a time when a robot starts a work of sorting items and a target state which represents a state where the items are placed in sorting containers by the work, based on information regarding the items and the sorting containers (step S21). Then, the operation planning means 17X is configured to determine an operation plan of the robot based on the predicted start state and the target state (step S22).

According to the configuration of the second example embodiment, the control device 1X can suitably formulate a robot's operation plan for sorting operations of items having a potential of pipelining.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above (including modifications, the same applies hereinafter) can be described as, but not limited to, the following Supplementary Notes.

Supplementary Note 1

A control device comprising:
a state setting means configured to set
 a predicted start state that is a predicted state of a workspace at a time when a robot starts a work of sorting items and
 a target state which represents a state where the items are placed in sorting containers by the work,
 based on information regarding the items and the sorting containers;

an operation planning means configured to determine an operation plan of the robot based on the predicted start state and the target state.

Supplementary Note 2

The control device according to Supplementary Note 1, wherein the work is periodically performed, and
wherein the state setting means is configured to set the predicted start state and the target state for a current cycle, before completion of the work based on the operation plan for the preceding cycle.

Supplementary Note 3

The control device according to Supplementary Note 2, wherein the state setting means is configured to set the predicted start state representing
states of the items conveyed within a movement range of the robot and
states of the sorting containers after the completion of the work based on the operation plan for the preceding cycle.

Supplementary Note 4

The control device according to any one of Supplementary Notes 1 to 3,
wherein the state setting means is configured to set the target state based on the predicted start state and classification of the items.

Supplementary Note 5

The control device according to any one of Supplementary Notes 1 to 4, further comprising
a sorting target determination means configured to select an item to be sorted in the work from the items conveyed by a conveying machine, based on a measurement signal outputted by a measuring device which measures the workspace.

Supplementary Note 6

The control device according to any one of Supplementary Notes 1 to 5,
wherein the operation planning means is configured to generate, as the operation plan, an operation sequence, which represents time-step based operations of the robot, based on a logical formula,
the logical formula representing a task of the robot in a form of a temporal logic,
the task being specified by the predicted start state and the target state.

Supplementary Note 7

The control device according to Supplementary Note 6, further comprising
a robot control means configured to control the robot based on the operation sequence.

Supplementary Note 8

The control device according to any one of Supplementary Notes 1 to 7, further comprising
a sorting container control means configured to control unloading and replenishment of the sorting containers, based on at least one of
a measurement result of states of the items and the sorting containers and the operation plan.

Supplementary Note 9

The control device according to any one of Supplementary Notes 1 to 8, further comprising
a conveying machine control means configured to control a conveying machine for conveying the items based on a state of the work.

Supplementary Note 10

A control method executed by a computer, the control method comprising
setting
a predicted start state that is a predicted state of a workspace at a time when a robot starts a work of sorting items and
a target state which represents a state where the items are placed in sorting containers by the work,
based on information regarding the items and the sorting containers;
determining an operation plan of the robot based on the predicted start state and the target state.

Supplementary Note 11

A storage medium storing a program executed by a computer, the program causing the computer to:
set
a predicted start state that is a predicted state of a workspace at a time when a robot starts a work of sorting items and
a target state which represents a state where the items are placed in sorting containers by the work,
based on information regarding the items and the sorting containers;
determine an operation plan of the robot based on the predicted start state and the target state.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1X Control Device
2 Warehouse control equipment
3 Communication network
4 Measurement device 5 Control target equipment
41 Camera
42 Lidar
43 BCR
51 Robot
52 Conveying machine
53 Sorting container management machine
100, 100A Sorting control system

What is claimed is:

1. A control device comprising:
at least one memory configured to store instructions; and
at least one processor configured to execute the instructions to:
set, for a current cycle,
- a predicted start state that is a predicted state of a workspace at a time when a robot starts a work of sorting items into sorting containers and that represents
- states of the items conveyed within a movement range of the robot and
- states of the sorting containers after completion of the work based on an operation plan for a preceding cycle, and
  - a target state which represents a state where the items are placed in the sorting containers by the work, based on information regarding the items and the sorting containers,
wherein the predicted start state and the target state for the current cycle is set before the completion of the work based on the operation plan for the preceding cycle;
determine an operation plan of the robot based on the predicted start state and the target state; and
control the robot based on the operation plan.

2. The control device according to claim 1,
wherein the at least one processor is configured to execute the instructions to set the target state based on the predicted start state and classification of the items.

3. The control device according to claim 1,
wherein the at least one processor is configured to further execute the instructions select an item to be sorted in the work from the items conveyed by a conveying machine, based on a measurement signal outputted by a measuring device which measures the workspace.

4. The control device according to claim 1,
wherein the at least one processor is configured to execute the instructions to generate, as the operation plan, an operation sequence, which represents time-step based operations of the robot, based on a logical formula,
the logical formula representing a task of the robot in a form of a temporal logic,
the task being specified by the predicted start state and the target state.

5. The control device according to claim 1,
wherein the at least one processor is configured to execute the instructions to control unloading and replenishment of the sorting containers, based on at least one of
a measurement result of states of the items and the sorting containers and
the operation plan.

6. The control device according to claim 1,
wherein the at least one processor is configured to further execute the instructions configured to control a conveying machine for conveying the items based on a state of the work.

7. The control device according to claim 1,
wherein the work includes plural cycles of a determination of the operation plan and an execution of the control of the robot and
wherein the at least one processor is configured to execute the instructions to determine the operation plan for the current cycle while controlling the robot based on the operation plan for the preceding cycle.

8. A control method executed by a computer, the control method comprising
setting, for a current cycle,
- a predicted start state that is a predicted state of a workspace at a time when a robot starts a work of sorting items into sorting containers and that represents
- states of the items conveyed within a movement range of the robot and
- states of the sorting containers after completion of the work based on an operation plan for a preceding cycle, and
  - a target state which represents a state where the items are placed in the sorting containers by the work, based on information regarding the items and the sorting containers,
wherein the predicted start state and the target state for the current cycle is set before the completion of the work based on the operation plan for the preceding cycle;
determining an operation plan of the robot based on the predicted start state and the target state; and
controlling the robot based on the operation plan.

9. A non-transitory computer readable storage medium storing a program executed by a computer, the program causing the computer to:
set, for a current cycle,
- a predicted start state that is a predicted state of a workspace at a time when a robot starts a work of sorting items into sorting containers and that represents
- states of the items conveyed within a movement range of the robot and
- states of the sorting containers after completion of the work based on an operation plan for a preceding cycle, and
  - a target state which represents a state where the items are placed in the sorting containers by the work, based on information regarding the items and the sorting containers,
wherein the predicted start state and the target state for the current cycle is set before the completion of the work based on the operation plan for the preceding cycle;
determine an operation plan of the robot based on the predicted start state and the target state; and
control the robot based on the operation plan.

* * * * *